United States Patent
Takeuchi et al.

(10) Patent No.: US 11,343,984 B2
(45) Date of Patent: May 31, 2022

(54) HYDROPONIC SYSTEM USING SEAWATER AND CULTIVATION SYSTEM FOR GROWING SEEDS AND SEEDLINGS

(71) Applicant: SEKISUI CHEMICAL CO., LTD., Osaka (JP)

(72) Inventors: Toshimasa Takeuchi, Tsukuba (JP); Setsuo Nakajima, Tokyo (JP); Seigo Ono, Tsukuba (JP); Koichiro Iwasa, Tokyo (JP); Makoto Fujigami, Fujisawa (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 428 days.

(21) Appl. No.: 16/074,811

(22) PCT Filed: Feb. 27, 2017

(86) PCT No.: PCT/JP2017/007413
§ 371 (c)(1),
(2) Date: Aug. 2, 2018

(87) PCT Pub. No.: WO2017/169426
PCT Pub. Date: Oct. 5, 2017

(65) Prior Publication Data
US 2019/0037788 A1 Feb. 7, 2019

(30) Foreign Application Priority Data

Mar. 31, 2016 (JP) .............................. JP2016-073438
Mar. 31, 2016 (JP) .............................. JP2016-073439

(51) Int. Cl.
*A01G 31/02* (2006.01)
*A01G 31/00* (2018.01)
(Continued)

(52) U.S. Cl.
CPC ............. *A01G 31/02* (2013.01); *A01G 31/00* (2013.01); *C02F 1/62* (2013.01); *C02F 2101/20* (2013.01);
(Continued)

(58) Field of Classification Search
CPC ........ A01G 31/02; A01G 31/00; A01G 31/06; A01G 2031/006; A01G 33/00;
(Continued)

(56) References Cited

U.S. PATENT DOCUMENTS 3,250,606 A * 5/1966 Murray .................... C05D 9/00
71/1
6,858,430 B1 * 2/2005 Reddy .................... A01H 4/008
435/420
(Continued)

FOREIGN PATENT DOCUMENTS

CN 103385128 11/2013
CN 203761928 8/2014
(Continued)

OTHER PUBLICATIONS

Extended European Search Report dated Dec. 17, 2019 in corresponding European Patent Application No. 17773971.1.
(Continued)

*Primary Examiner* — Trinh T Nguyen
(74) *Attorney, Agent, or Firm* — Wenderoth, Lind & Ponack, L.L.P.

(57) ABSTRACT

A hydroponic system (1) using seawater, wherein seawater (W1) is used for hydroponic cultivation of salt-tolerant plants, including a water supply pump (21) that pumps up, from the sea (S), seawater (W1) having a salinity, a bacteria content and an unwanted matter content are less than or equal to predetermined threshold values; a water tub (30) that stores seawater (W1) pumped up by the water supply pump (21) and accommodates salt-tolerant plants (P) to be cultivated; and a filter (27) that removes bacteria and unwanted matter from the seawater (W1) obtained from the sea (S); wherein the seawater (W1) from which the bacteria
(Continued)

and the unwanted matter have been removed by the filter (27) is fed to the water tub (30).

6 Claims, 13 Drawing Sheets

(51) Int. Cl.
*C02F 1/62* (2006.01)
*C02F 101/20* (2006.01)
*C02F 103/08* (2006.01)

(52) U.S. Cl.
CPC ...... *C02F 2103/08* (2013.01); *C02F 2209/10* (2013.01); *C02F 2303/04* (2013.01)

(58) Field of Classification Search
CPC .. A01G 27/001; A01G 27/003; A01G 27/005; A01G 27/006; A01G 27/02; A01G 27/06; A01G 9/02; Y02P 60/21; C02F 1/62; C02F 2101/20
See application file for complete search history.

(56) References Cited

U.S. PATENT DOCUMENTS

| | | | |
|---|---|---|---|
| 2010/0236137 A1* | 9/2010 | Wu | C10L 1/19 44/385 |
| 2014/0237897 A1 | 8/2014 | Lotvak et al. | |
| 2019/0223395 A1* | 7/2019 | Warrick | C02F 1/001 |

FOREIGN PATENT DOCUMENTS

| | | |
|---|---|---|
| CN | 204443658 | 7/2015 |
| CN | 105036346 | 11/2015 |
| CN | 204762658 | 11/2015 |
| GB | 2472040 | 1/2011 |
| JP | 04-121120 | 4/1992 |
| JP | 8-242712 | 9/1996 |
| JP | 2003-154360 | 5/2003 |
| JP | 2005-110586 | 4/2005 |
| JP | 2005-224105 | 8/2005 |
| JP | 2007-532109 | 11/2007 |
| JP | 2008-118946 | 5/2008 |
| JP | 2013-75881 | 4/2013 |
| JP | 2015-171326 | 10/2015 |
| JP | 2016-104002 | 6/2016 |
| KR | 10-2013-0005563 | 1/2013 |
| WO | 2005/102030 | 11/2005 |

OTHER PUBLICATIONS

Partial Supplementary European Search Report dated Sep. 10, 2019 in corresponding European Patent Application No. 17773971.1
Office Action dated Dec. 26, 2019 in Chinese Patent Application No. 201780009531.9, with English Translation.
International Search Report dated May 30, 2017 in International (PCT) Application No. PCT/JP2017/007413.

* cited by examiner

HYDROPONIC SYSTEM USING SEAWATER AND CULTIVATION SYSTEM FOR GROWING SEEDS AND SEEDLINGS

TECHNICAL FIELD

The present invention relates to a hydroponic system wherein seawater is used for hydroponic cultivation of salt-tolerant plants, and a cultivation system for seeding and growing seedlings.

The present application claims priority on Japanese Patent Application No. 2016-073439, filed Mar. 31, 2016, and Japanese Patent Application No. 2016-073438, filed Mar. 31, 2016, the contents of which are incorporated herein by reference.

BACKGROUND ART

Heretofore, plant factories for cultivating plants such as edible vegetables in indoor facilities have been increasing. At such plant factories, the seeding to cultivation containers, supplying of nutrients through media in the containers, sprouting by irradiation with light from light sources such as fluorescent lamps or LEDs, greening, growth of seedlings, cultivation and harvesting are performed in environments where the temperature and humidity are controlled to be suitable for the growth of plants. The vegetables cultivated in plant factories are favorable in many respects; for example, such vegetable can be supplied stably without being affected by the weather, the nutritional values of the vegetables are high due to being cultivated with optimized cultivation materials, and such vegetables are pest-free and therefore can be cultivated without using agrochemicals. Also known is a plant growth method in which the plants are grown into seedlings using fresh water and thereafter cultivated using salt water (seawater).

Further, as a plant cultivation method for cultivation with salt water (seawater), it is known, as described, for example, in Patent Document 1, to use salt-tolerant plants such as mangroves as the rootstock for plant-grafting cultivation in which a scion is grafted to a rootstock are known, thereby enabling cultivation in salt water environment.

Furthermore, gene modification is practiced as a method for making plants salt-tolerant, as described, for example, in Patent Document 2. This Patent Document 2 describes genes that simultaneously impart disease resistance, drought resistance, salt tolerance, improved photosynthesis efficiency and increased tiller number.

RELATED LITERATURE

Patent Literature

[Patent Document 1]
    JP 2005-224105 A
[Patent Document 2]
    JP 2015-171326 A

SUMMARY OF INVENTION

Technical Problem

However, conventionally, there have been no large-scale systems that can realize a salt tolerance against salinity of a seawater-level when cultivating salt-tolerant plants, and it has been desired to develop a seawater hydroponic system capable of mass production using seawater.

Further, when using seawater for cultivation, amounts of bacteria and unwanted waste, as well as substances that are detrimental to the growth of plants or to humans, such as heavy metals, must be removed, and there was room for improvement in this regard.

Furthermore, for is the produce obtained as food plants, it is desired to develop methods without using gene modification as described in the above-mentioned Patent Document 2.

Furthermore, it is known that, when using salt water for cultivation, it is difficult to induce rooting in media having a salinity of about seawater-level. In other words, the step of inducing sprouting and rooting is extremely sensitive to the salinity, so that a specific structure for a seedling bed for growing seedlings with seawater that can impart plants with tolerance against a seawater-level salinity has not been realized. For this reason, it has been desired to design a structure allowing the effective cultivation of plants using salt water at a low cost and without a complicated structure.

The present invention has been made in consideration of the above-mentioned problems, and the purpose of the present invention is to provide a hydroponic system which enables a seawater-based hydroponic cultivation using seawater, while removing unwanted matter such as bacteria and waste.

Further, the present invention has been made in consideration of the above-mentioned problems, and another purpose of the present invention is to provide a cultivation system for seeding and growing seedlings, which enables excellent cultivation using salt water by means of a simple, low-cost structure.

Solution to Problem

Embodiments of the present invention made in order to solve the above-mentioned problems and achieve the purposes are as enumerated below.

(1) The hydroponic system using seawater according to one embodiment of the present invention is a hydroponic system using seawater for hydroponic cultivation of salt-tolerant plants, which includes a water supply pump that pumps up, from the sea, seawater having a salinity, a bacteria content and an unwanted matter content that are less than or equal to predetermined threshold values; a water tub that stores seawater pumped up by the water supply pump and accommodates salt-tolerant plants to be cultivated; and a removal unit that removes bacteria and unwanted matter from the seawater obtained from the sea; wherein the seawater from which the bacteria and the unwanted matter have been removed by the removal unit is fed to the water tub.

In this instance, seawater having a salinity, a bacteria content and an unwanted matter content that are less than or equal to predetermined threshold values is pumped up from the sea, and bacteria and unwanted matter can be removed from this seawater by means of the removal unit, then supplied to and stored in the water tub, thereby allowing salt-tolerant plants to be hydroponically cultivated in the water tub. Thus, the hydroponic system uses seawater obtained from the sea, whereby a large-scale, high-productivity facility for seawater-based hydroponic cultivation can be realized.

(2) In the hydroponic system using seawater according to (1) above, the removal unit may have a function of removing substances that inhibit growth of the salt-tolerant plants due to heavy metals, and substances that are harmful to humans.

In this instance, salt-tolerant plants can be reliably grown with seawater, by using the removal unit to remove substances that inhibit growth of the salt-tolerant plants due to heavy metals, and substances that are harmful to humans.

(3) The hydroponic system using seawater according to (1) or (2) above may further include a monitoring unit that detects the properties of the seawater before being supplied to the water tub and the seawater after being supplied to the water tub.

In this instance, by using the monitoring unit to detect and monitor the properties, such as the salinity, the fertilizer content and the microbe content of the seawater before and after the seawater is supplied to the water tub, the seawater in the water tub can be stabilized and the yield for the cultivation can be improved. Furthermore, by using a structure that allows some or all of the seawater to be replaced with new one, it is possible to avoid necrosis in the salt-tolerant plants, thereby improving the productivity.

(4) The hydroponic system using seawater according to any one of (1) to (3) above may be configured to replace some or all of the seawater in the water tub with new one.

In this instance, even if the seawater having been stored in the water tub is contaminated with bacteria, unwanted matter or plant inhibiting substances, or the salinity becomes higher, some or all of the seawater in the water tub can be replaced with fresh one.

Additionally, some or all of the seawater in the water tub can be replaced by means of a simple structure by forming a flow passage for discharging the seawater from the water tub into the sea.

(5) The hydroponic system using seawater according to any one of (1) to (4) above may further include a seawater temperature adjustment unit that adjusts the temperature of the seawater supplied to the water tub.

In this instance, the seawater supplied to the water tub may be cooled to seawater temperature by means of the seawater temperature adjustment unit before being supplied to the water tub, thereby holding the seawater temperature in the water tub constant.

(6) The hydroponic system using seawater according to any one of (1) to (5) above may further include a dissolved oxygen supply unit that supplies dissolved oxygen to the seawater supplied to the water tub.

In this instance, a satisfactory level of the dissolved oxygen concentration of the seawater to be supplied to the water tub can be ensured by the dissolved oxygen supply unit, thereby cleaning the seawater in the water tub and promoting the growth of salt-tolerant plants.

(7) A cultivation system according to another embodiment of the present invention is a cultivation system for seeding and growing salt-tolerant seedlings with a salt-tolerance-imparting agent, comprising a fresh water medium portion provided in a fresh water medium area for inducing sprouting and rooting of the salt-tolerant seedlings by using fresh water; and a salt water portion provided in a salt water medium area for growing roots of the rooted salt-tolerant seedlings while being soaked in salt water; wherein, during at least a fresh water growth period in which sprouting and rooting are induced in the fresh water medium portion, a salt diffusion inhibition portion is provided between the fresh water medium portion and the salt water portion.

In this instance, the sprouting and rooting of the salt-tolerant seedlings can be induced with the salt water portion and the fresh water medium portion being separated by a salt diffusion inhibition portion, and furthermore, after sprouting and rooting, the roots can be grown while being soaked in salt water in the salt water portion. In other words, in the seeding stage prior to sprouting and rooting, during which the deposition of salt has a harmful effect, the salt-tolerant seedlings can be grown only in fresh water isolated from salt water, and the plants can be grown in salt water at the salt water portion after the growth has reached a stage where the roots have grown to same extent and the growth can be promoted by salt. For this reason, the salt-tolerant seedlings can be kept from withering and the productivity can be improved.

Additionally, in the present invention, the salt diffusion inhibition portion may have a simple structure wherein, for example, a gap portion is provided between the fresh water medium portion and the salt water portion, thereby suppressing the cost of equipment.

(8) In the cultivation system for seeding and growing seedlings according to (7) above, the fresh water medium portion may include a support that is removable from the salt water portion, and the support may be positioned above the salt water in the salt water portion.

In this instance, the support provided in the fresh water medium portion is removably provided at a position above the salt water portion, thereby enabling subsequent cultivation to be performed by appropriately replacing the support, which can increase the productivity. For example, if a support is provided for each salt-tolerant seedling, it becomes possible to replace the supports in the salt water portion in accordance with the growth state of each salt-tolerant seedling. Additionally, if a support is provided for multiple salt-tolerant seedlings, multiple salt-tolerant seedlings can be simultaneously replaced by replacing just a single support in the salt water portion, thereby improving the work efficiency.

(9) In the cultivation system for seeding and growing seedlings according to (7) or (8) above, the salt-tolerance-imparting agent may be provided in at least one of the fresh water in the fresh water medium portion and the salt water in the salt water portion.

In this instance, it is easy to allow a salt-tolerance-imparting agent to adhere to the salt-tolerant seedlings with a simple configuration wherein a salt-tolerance-imparting agent is provided in the fresh water contained in the fresh water medium portion or the salt water in the salt water portion.

(10) In the cultivation system for seeding and growing seedlings according to any one of (7) to (9) above, the salt-tolerance-imparting agent may be a microbe.

In this instance, the microbe is allowed to adhere to the salt-tolerant seedling during the growth thereof, thereby enabling the salt-tolerant seedling to grow.

(11) In the cultivation system for seeding and growing seedlings according to any one of (7) to (10) above, the salt diffusion inhibition portion may be a clearance provided between the fresh water medium portion and the salt water portion.

(12) In the cultivation system for seeding and growing seedlings according to (11) above, the clearance may be at least 1 mm, or at least 10 cm and at most 30 cm.

In this instance, the fresh water medium portion and the salt water are separated by the clearance, whereby salt water can be prevented from diffusing into and adhering to the fresh water medium portion or the seeds of the salt-tolerant seedlings before sprouting and rooting.

Additionally, by changing the size of the clearance, the timing for contacting the roots of the salt-tolerant seedlings with the salt water or the salt-tolerance-imparting agent can be shifted, which enables the control of growth rate of the salt-tolerant seedlings.

(13) In the cultivation system for seeding and growing seedlings according to any one of (7) to (10) above, the salt diffusion inhibition portion may be a film-type semi-permeable membrane provided between the fresh water medium portion and the salt water of the salt water portion.

In this instance, the fresh water medium portion and the salt water are separated by a semi-permeable membrane, whereby salt water can be prevented from diffusing into and adhering to the fresh water medium portion or in the seeds of the salt-tolerant seedlings before sprouting and rooting.

Additionally, by changing the material or thickness of the semi-permeable membrane or the like, the timing for contacting the roots of the salt-tolerant seedlings with the salt water or the salt-tolerance-imparting agent can be shifted, thereby enabling the control of growth rate of the salt-tolerant seedlings.

(14) In the cultivation system for seeding and growing seedlings according to any one of (7) to (13) above, the fresh water medium portion may include a semi-solid medium that blocks salt infiltration.

In this instance, by sowing seeds in the semi-solid medium that blocks salt infiltration, the adhesion of salt to the seeds of the salt-tolerant seedlings can be more surely prevented.

(15) In the cultivation system according to any one of (7) to (14) above, the salt water portion may comprise a semi-solid medium that blocks salt diffusion.

In this instance, by the presence of salt water in the semi-solid medium that blocks salt diffusion, it is possible to suppress the diffusion of salt to the environs.

Effects of Invention

With the hydroponic system using seawater according to the embodiments of the present invention, seawater-based hydroponic cultivation using seawater can be realized, and hydroponic cultivation can be performed while removing unwanted matter such as bacteria and waste.

Additionally, with the cultivation system according to the further embodiments of the present invention, excellent cultivation can be achieved by using seawater, by means of a simple, low-cost structure.

DESCRIPTION OF EMBODIMENTS

Hereinbelow, the hydroponic system using seawater and the cultivation system for seeding and growing seedlings according to embodiments of the present invention will be explained with reference to the drawings.

First Embodiment

Figure 1:
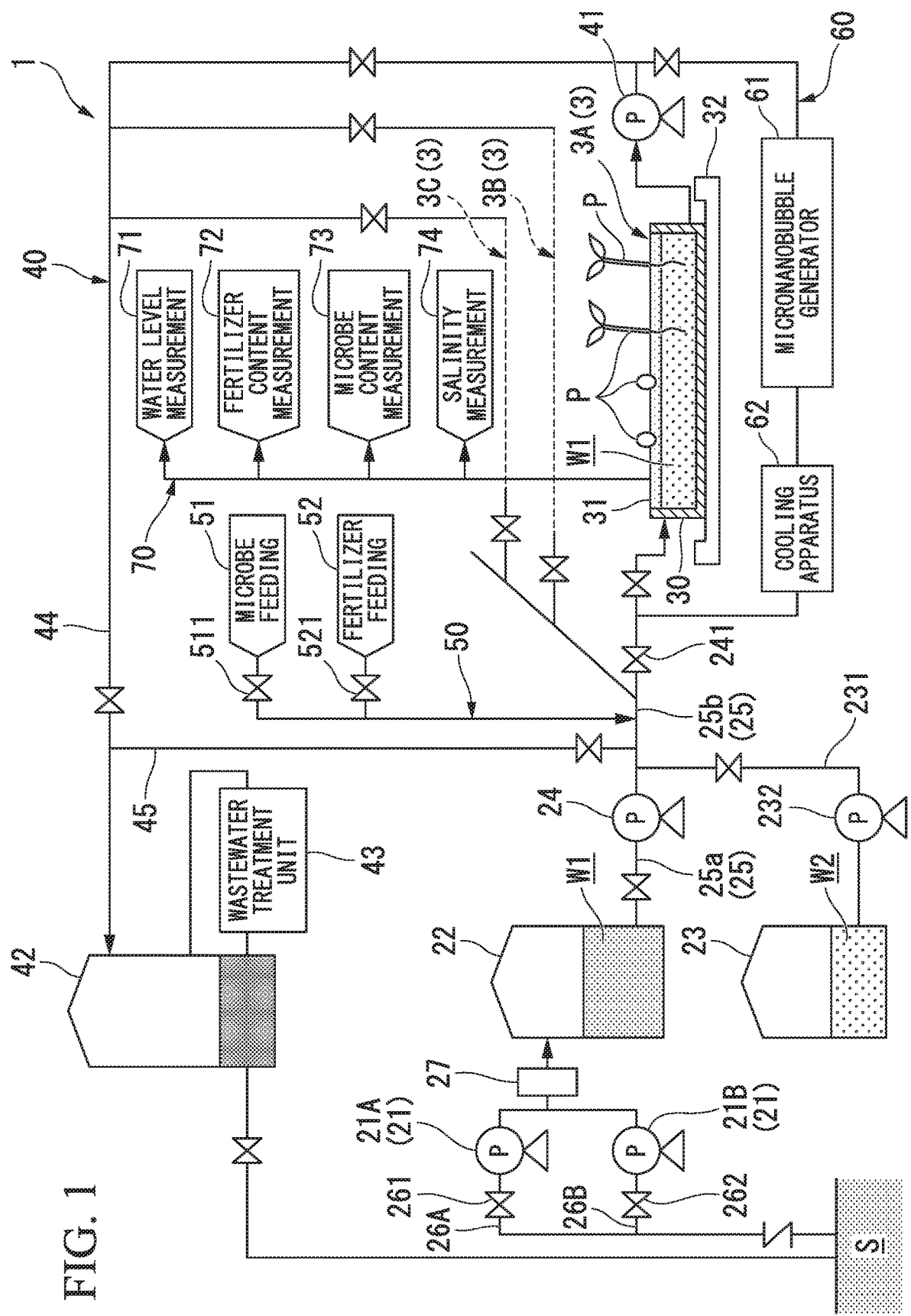
FIG. 1 is a diagram schematically showing a hydroponic system using seawater according to a first embodiment of the present invention.
Figure 2:
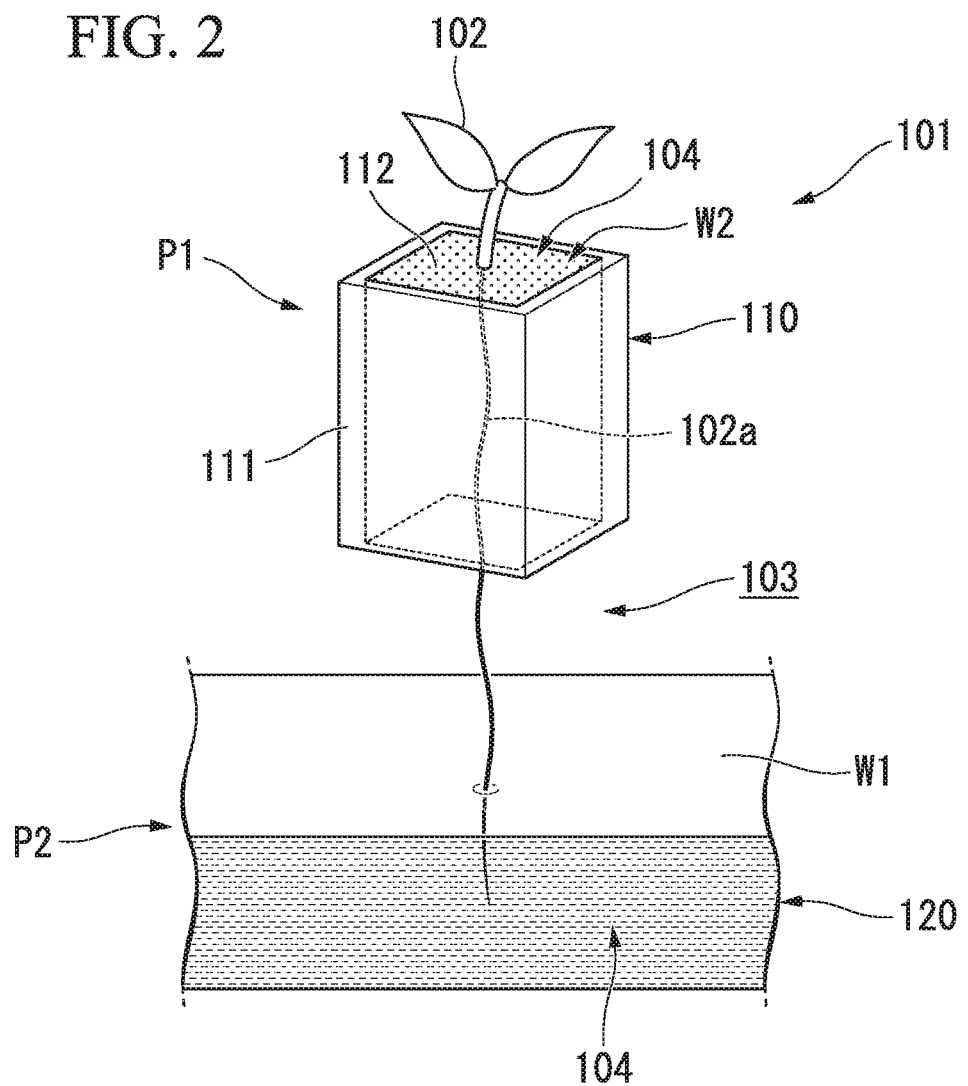
FIG. 2 is a perspective view schematically showing a cultivation system for seeding and growing seedlings according to a second embodiment of the present invention.

As shown in FIG. 1, the hydroponic system 1 according to the present embodiment is for hydroponic cultivation of a salt-tolerant plant P using seawater W1 obtained from the sea S.

The hydroponic system 1 includes a water supply pump 21 that pumps up seawater W1 from the sea S, a water tub 30 which stores the seawater W1 pumped up by the water supply pump 21 and accommodates salt-tolerant plants P to be cultivated, and a circulation pump 41 that drains the seawater W1 in the water tub 30 or that passes and circulates the seawater W1 through a circulation system 60 to be described below.

For the purposes of explaining the present embodiment, the water-supply-side system including the water pump 21 between the sea S and the water tub 30 will be referred to as the water feeding system 20, and the drainage-side system between the water tub 30 and the sea S will be referred to as the drainage system 40.

Additionally, in the present hydroponic system 1, multiple water tubs 30, 30, ... are provided, and a cultivation system 3 (3A, 3B, 3C, ... ) is formed for each water tub 30. In FIG. 1, only one system, indicated by reference number 3A, is shown in detail, and other systems (reference numbers 3B and 3C) are indicated by dashed lines.

The water feeding system 20 comprises a pair of the water supply pumps 21 (21A, 21B), a seawater supply tank 22 for temporarily storing seawater W1 that has been pumped up from the sea S by the water supply pumps 21A, 21B, a fresh water supply tank 23 for stabilizing the water quality by mixing fresh water W2 into the seawater W1, and a water feeding pump 24 provided on a water feeding pipe 25 that connects the seawater supply tank 22 with the water tub 30.

The water supply pumps 21A and 21B are arranged in parallel, and are respectively connected to the sea S via water supply pipes 26A, 26B. Water supply valves 261, 262 are respectively provided on the water supply pipes 26A, 26B. By appropriately opening and closing the water supply valves 261 and 262, a desired amount of seawater W1 is stored in the seawater supply tank 22. The seawater W1 supplied by the pair of water supply pumps 21A, 21B is sent through a filter 27 (removal unit) to the seawater supply tank 22. Additionally, by arranging the pair of water supply pumps 21A, 21B in parallel, one of the pumps may be stopped while driving the other during maintenance or occurrence of malfunctions.

As for the water obtained by the water supply pumps 21A, 21B, the pumps are preferably configured to obtain seawater W1 at, for example, 5 cm or deeper from the sea surface, thus excluding the water at the surface.

The filter 27 removes bacteria such as plankton and unwanted matter such as waste from the seawater W1 obtained by the water supply pump 21. The filter 27 preferably has the function of removing substances that inhibit the growth of salt-tolerant plants due to heavy metals, and substances that are harmful to humans. Furthermore, seawater W1 from which bacteria and unwanted matter has been removed by the filter 27, as mentioned above, is stored in the seawater supply tank 22 and is further fed to the water tub 30.

Additionally, the hydroponic system 1 according to the present embodiment is provided with a monitoring unit (the water tub monitoring unit 70 described below) that detects the properties of the seawater W1 before being supplied to the water tub 30 and the seawater W1 after being supplied to the water tub 30.

The water feeding pipe 25 (25a) between the seawater supply tank 22 and the water feeding pump 24 is provided with a water feeding valve 241. By appropriately opening and closing this water feeding valve 241, the seawater W1 stored in the seawater supply tank 22 can be fed to the water tub 30.

A fresh water pipe 231 connected to the fresh water supply tank 23 is connected to the water feeding pipe 25 (25a) between the water feeding valve 241 and the water feeding pump 24. The fresh water pipe 231 is provided with a fresh water supply pump 232. Specifically, the configuration allows the water quality to be stabilized by activating the fresh water supply pump 232 and mixing fresh water W2 into the seawater W1 in the water feeding pipe 25 after evaluating the water quality of the seawater W1 by monitoring the water for substances that are detrimental to the cultivation of salt-tolerant plants P and the like.

A growth promoter supply system 50 is connected to the water feeding pipe 25 (25b) between the water feeding pump 24 and the water tub 30. A microbe feeder 51 and a fertilizer feeder 52 are provided in the growth promoter supply system 50. At the microbe feeder 51 and the fertilizer feeder 52, appropriate amounts of microbes and fertilizers are fed into the seawater W1 in the water feeding pipe 25 (25b) on the basis of detection values for the microbe concentration or the fertilizer concentration in the seawater W stored in the water tub 30, or the flow rate of seawater W1 in the water tub 30. The microbe feeder 51 and the fertilizer feeder 52 are respectively provided with on/off feeding valves 511, 521.

Examples of the microbes that may be fed into the seawater W1 include those disclosed in *Journal of Plant Interactions*, Volume 9, Issue 1, 2014 or the like.

Additionally, examples of the fertilizer that may be fed into the seawater W1 include the liquid fertilizer Hyponex (manufactured by Hyponex Japan), the solid fertilizer Ajina Yasai no Hiryo [Ajina Vegetable Fertilizer] (manufactured by Takii) and the organic fertilizer Kotsufun-iri Yuki Hiryo [Organic Fertilizer with Bone Powder] (manufactured by Asahi Industries).

The water tub 30 is provided above a leak prevention sheet 32 that prevents the stored seawater W1 from leaking out into the environs. In the water tub 30, there is provided a semi-solid medium 31 in which seeds or rooted seedlings of the salt-tolerant plants P are placed, and which is detachably disposed on an upper edge portion of the water tub 30.

The semi-solid medium 31 has, for example, a porous sponge material fitted in a rectangular tubular support that is formed of a material such as plastic, ceramics, foamed resin or wood. This sponge material is composed of a material that can support salt-tolerant plants P from seeds to sprouting and rooting, and may, for example, be a synthetic sponge formed by foam-molding a synthetic resin such as polyurethane or a natural sponge obtained by processing live sea sponges.

The water tub 30 is provided with a water tub monitoring unit 70 (monitoring unit) that detects the properties of the seawater W1 in the water tub 30. The water tub monitoring unit 70 is provided with a water level detector 71, a fertilizer detector 72, a microbe detector 73 and a salinity detector 74.

The water level detector 71 measures the water level of the seawater W1 in the water tub 30. The amount of water in the water tub 30 is controlled based on the water level measured by the water level detector 71, and for example, the water level is controlled to be lowered at the time of feeding the microbes.

The fertilizer detector 72 measures the fertilizer concentration in the seawater W1 in the water tub 30 or measures the flow rate of the seawater W1. The amount of fertilizer fed by the above-mentioned fertilizer feeder 52 is controlled based on the fertilizer concentration obtained on the basis of the fertilizer concentration or the flow rate measured by the fertilizer detector 72.

The microbe detector 73 measures the microbe concentration in the seawater W1 in the water tub 30 or measures the flow rate of the seawater W1. The amount of microbes fed by the above-mentioned microbe feeder 51 is controlled based on the microbe concentration obtained on the basis of the microbe concentration or the flow rate measured by the microbe detector 73.

The salinity detector 74 measures the salinity of the seawater W1 in the water tub 30. If the salinity measured by the salinity detector 74 is higher than, for example, a predetermined standard, then control is implemented to replace some or all of the seawater W1 in the water tub 30 with new one, or control is implemented to adjust the salinity by supplying fresh water W2 from the fresh water supply tank 23.

The drainage system 40 includes the aforementioned circulation pump 41 disposed downstream of the water tub 30, a wastewater tank 42 that temporarily stores the seawater W1 fed from the water tub 30 by means of the circulation pump 41 and drains the water to the sea S, and a wastewater treatment unit 43 that performs a wastewater treatment on the seawater W1 collected in the wastewater tank 42. An intermediate drainage pipe 45 that is branched from the water feeding pipe 25 (25b) is connected to an intermediate portion of a drainage pipe 44 connecting the circulation pump 41 to the wastewater tank 42. For example, if the water quality of the seawater W1 fed from the water feeding pump 24 to the water tub 30 falls outside a suitable range, the seawater W1 disqualified as falling outside the suitable range is fed to the wastewater tank 42 through the intermediate wastewater pipe 45.

By providing the wastewater tank 42 near the sea S, the seawater W1 in the tank can be ejected into the sea S by natural downflow. It is also possible to drain the water into the sea S by using a drainage pump, which is not shown.

Additionally, the above-mentioned circulation system 60 is a system that circulates seawater W1 into the water tub 30 and has a flow passage that branches at a position downstream of the circulation pump 41 and that joins the water feeding pipe 25 (25b) between the water feeding pump 24 and the water tub 30. The circulation system 60 includes a micronanobubble generator 61 (dissolved oxygen supply unit) that supplies dissolved oxygen to the seawater W1 discharged by the circulation pump 41, and a cooling apparatus 62 (seawater temperature adjustment unit) that cools the temperature of the seawater W1 drained from the circulation pump 41 to seawater temperature.

The micronanobubble generator 61 has the function of cleaning the seawater W1 and promoting the growth of the salt-tolerant plants P by surely increasing dissolved oxygen in the seawater W1 that has flowed into the circulation system 60 from the circulation pump 41.

The cooling apparatus 62 is provided downstream of the micronanobubble generator 61 and has the function of cooling the seawater W1 with increased dissolved oxygen to seawater temperature.

Thus, in the present hydroponic system 1, the seawater temperature and the dissolved oxygen concentration in the water tub 30 can be kept constant by providing the micronanobubble generator 61 and the cooling apparatus 62 in the circulation system 60.

Next, the hydroponic cultivation method for salt-tolerant plants P using the above-described hydroponic system 1 will be explained with reference to FIG. 1.

First, seawater W1 is pumped up from the sea S by the water supply pumps 21A and 21B, then passed through the filter 27 and stored in the seawater supply tank 22. In this process, bacteria and unwanted matter are removed from the seawater W1 by means of the filter 27. Additionally, fresh water W2 is stored in the fresh water supply tank 23 from a fresh water source (a river or a water main) that is not shown.

Furthermore, in the present embodiment, a method wherein fresh water W2 is stored in the water tub 30 until the roots of all of the salt-tolerant plants P have grown to a predetermined length is used, and fresh water W2 is fed from the fresh water supply tank 23 to the water tub 30 by means of the water feeding pump 24, without feeding the seawater W1 from the seawater supply tank 22 storing the seawater W1. Furthermore, the fresh water W2 in the water tub 30 is replaced with seawater W1, for example, 3 to 7 days after the roots of the salt-tolerant plants P have reached the surface of the fresh water W2 in the water tub 30.

Next, the fresh water W2 in the water tub 30 is fed to the wastewater tank 42 by means of the circulation pump 41, and after performing a wastewater treatment on this fresh water W2 in the wastewater treatment portion 43, the water is drained to the sea S.

Thereafter, the water feeding path of the water feeding pump 24 is switched from the fresh water supply tank 23 to the seawater supply tank 22 storing seawater W1, and the seawater W1 is supplied and stored in the water tub 30. In an initial stage of this process, the water level of the seawater W1 is set to be lower than the normal level in order to increase the opportunities for contact with microbes. There is also the advantage that the amount of microbes to be fed can be reduced by keeping the water level of the seawater W1 in the water tub 30 low.

During hydroponic cultivation, the circulation pump 41 is activated so that the seawater W1 in the water tub 30 is circulated by flowing through the circulation system 60, and the seawater W1 in the water tub 30 is set to a predetermined flow rate. In this process, the seawater W1 circulating in the circulation system 60 passes through the micronanobubble generator 61 and the cooling apparatus 62, so that the seawater temperature and the dissolved oxygen concentration in the water tub 30 are kept constant.

Furthermore, the water level, fertilizer concentration, microbe concentration and salinity of the seawater W1 in the water tub 30 are detected by the water tub monitoring unit 70, and control is implemented on the basis of these detection values. For example, if the fertilizer concentration or the microbe concentration in the seawater W1 is insufficient, a suitable amount of microbes or fertilizer is fed in accordance with the detected values, by the microbe feeder 51 or the fertilizer feeder 52 of the growth promoter supply system 50. Additionally, if the salinity is high, then it is possible to mix a suitable amount of fresh water W2 into the water tub 30, or to replace all of the seawater W1 in the water tub 30.

When the salt-tolerant plants P have grown, the seawater W1 in the water tub 30 is replaced. Specifically, the seawater W1 in the water tub 30 is fed to the wastewater tank 42 by the circulation pump 41, and is drained to the sea S after implementing a wastewater treatment in the wastewater treatment unit 43.

Next, the functions of the hydroponic system 1 using seawater described above will be explained in detail with reference to the drawings.

As shown in FIG. 1, in the present embodiment, seawater W1 having the salinity, the bacteria content and the unwanted matter content that are less than or equal to predetermined levels is pumped up from the sea S, and after removing the bacteria and unwanted matter by means of the filter 27, the seawater W1 is supplied to and stored in the water tub 30, thereby allowing salt-tolerant plants P to be hydroponically cultivated in the water tub 30.

Thus, the hydroponic system 1 uses seawater W1 obtained from the sea S, allowing for a large-scale, high-productivity location for seawater-based hydroponic cultivation to be realized.

Additionally, in the present embodiment, by using the filter 27 to remove substances that inhibit the growth of the salt-tolerant plants P due to heavy metals, and substances that are harmful to humans, the salt-tolerant plants P can be more reliably grown with seawater W1.

Additionally, in the present embodiment, by using the water tub monitoring unit 70 to detect and monitor the properties of the seawater W1 such as the salinity, the fertilizer and the microbe amounts thereof before and after being supplied to the water tub 30, the seawater W1 in the water tub 30 can be stabilized and the yield for cultivation can be improved. Furthermore, due to the structure allowing some or all of the seawater W1 to be replaced, it is possible to avoid necrosis in the salt-tolerant plants P and to improve the productivity.

Furthermore, in the hydroponic system 1 of the present embodiment, if the seawater W1 is contaminated with bacteria, unwanted matter or plant-inhibiting substances, or if the salinity of the seawater W1 becomes high after being stored in the water tub 30, some or all of the seawater W1 in the water tub 30 can be replaced.

Furthermore, by forming a drainage system 40 that discharges the seawater W1 in the water tub 30 into the sea S, some or all of the seawater W1 in the water tub 30 can be replaced by means of a simple structure.

With the hydroponic system using seawater according to the above-described embodiment, seawater-based hydroponic cultivation using seawater W1 can be realized, and hydroponic cultivation can be performed while removing unwanted matter such as bacteria and waste.

Next, other embodiments of the hydroponic system and the cultivation system for seeding and growing seedlings according to the present invention will be described with reference to the attached drawings, but components and parts that are identical or similar to those in the above-described first embodiment will be denoted by the same reference numbers and their descriptions will be omitted, and only the features that are different from those in the first embodiment will be explained.

Second Embodiment

As shown in FIGS. 2 and 3A to 3C, the cultivation system 101 for seeding and growing seedlings according to the present embodiment grows salt-tolerant seedlings 102 using a salt-tolerance-imparting agent, and cultivates the salt-tolerant seedlings 102 using seawater W1 (salt water) together with fresh water W2.

The cultivation system 101 includes a fresh water medium portion 110 that is provided in a fresh water medium area P1 in order to induce sprouting and rooting of salt-tolerant seedlings 102 by using fresh water W2, and a seawater portion 120 (salt water portion) that is provided in a seawater medium area P2 in order to soak and grow the roots 102a of rooted salt-tolerant seedlings 102 in seawater W1.

Figure 3A:
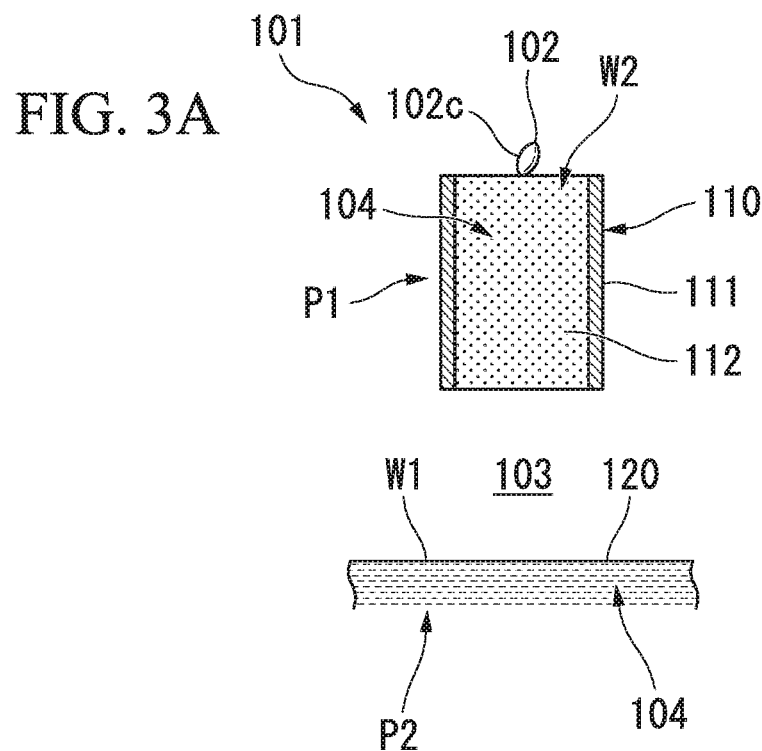
FIG. 3A is a diagram showing a cultivation step using the cultivation system shown in FIG. 2.
Figure 3B:
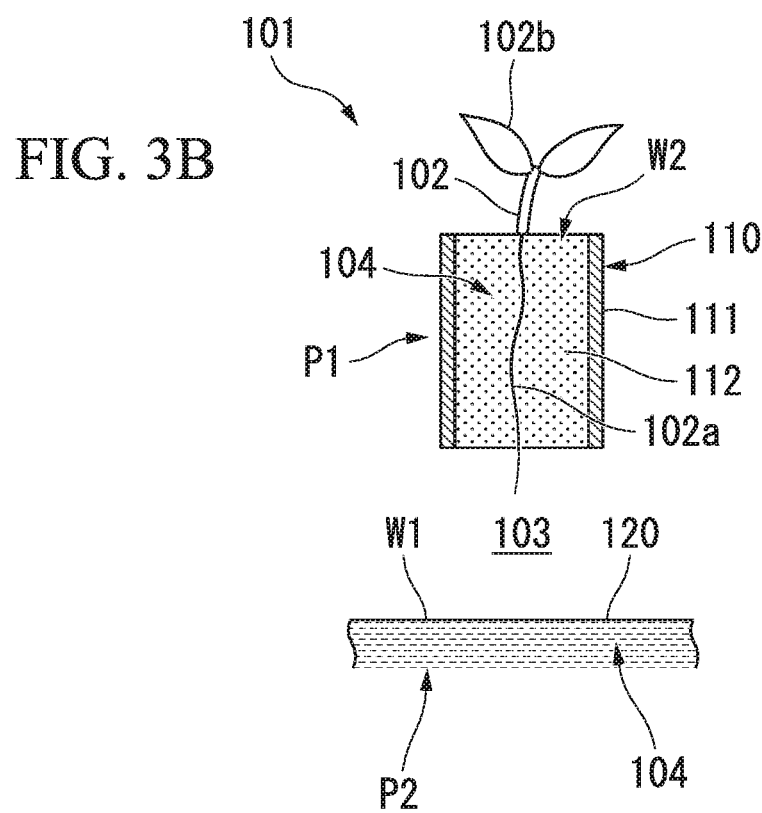
FIG. 3B is a diagram showing a cultivation step using the cultivation system shown in FIG. 2.
Figure 3C:
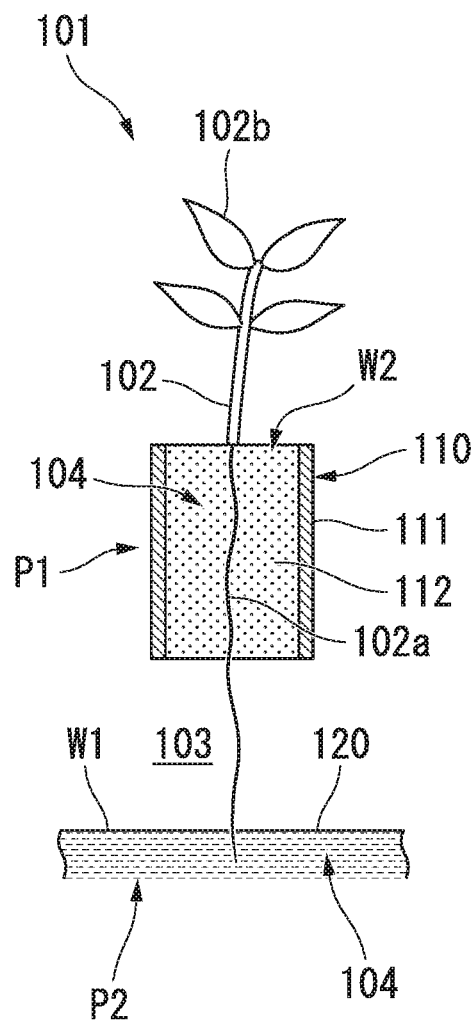
FIG. 3C is a diagram showing a cultivation step using the cultivation system shown in FIG. 2.

In this instance, the period spanning from the time of seeding of the salt-tolerant seedlings 102 to the time of sprouting and rooting thereof by using fresh water W2, as shown in FIG. 3A, is referred to as the fresh water cultivation period, and the period of time for growing the roots 102a of the salt-tolerant seedlings 102 in seawater W1, as shown in FIGS. 3B and 3C, is referred to as the seawater cultivation period.

Furthermore, a clearance 103 (salt diffusion inhibition portion) is provided and maintained between the fresh water medium portion 110 and the seawater portion 120 during the fresh water cultivation period.

In FIG. 2 and FIGS. 3A to 3C, the fresh water medium portion 110 is provided with a rectangular tubular support tube 111 (support) formed, for example, from a material such as plastic, ceramics, foamed resin or wood, that can be removed from the seawater portion 120. A porous sponge material 112 (semi-solid medium) that can contain fresh water W2 is fitted into a hollow portion of this support tube 111. In the present embodiment, the size of the support tube 111 is a size which allows a single salt-tolerant seedling 102 to grow to a desired size.

The sponge material 112 is made of a material that can contain fresh water W2 and that can support the salt-tolerant seedlings 102 inside the support tube 111 until seeds 102c sprouts and roots. For example, a synthetic sponge obtained by foaming and molding a synthetic resin such as polyurethane or a natural sponge obtained by processing live sea sponges may be used as the sponge material 112.

In the seawater portion 120, seawater W1 is stored in a water tub or the like, which is not shown, and the upper surface of the seawater W1 is positioned so as to leave a gap (the above-mentioned clearance 103), under multiple fresh water medium portions 110. In this case, the clearance 103 is set to be at least 1 mm, or at least 10 cm and at most 30 cm. In other words, when the clearance 103 is at least 1 mm, an oxygen depletion prevention effect is obtained, and the clearance of at least 10 cm and at most 30 cm has an advantage that this oxygen depletion prevention effect is further enhanced.

In this connection, FIG. 3A shows a seed 102c of a salt-tolerant seedling 102 having been sown onto a sponge material 112, that is, the seed 102c before sprouting and rooting. FIG. 3B shows the salt-tolerant seedling 102 having sprouted and rooted inside the sponge material 112. FIG. 3C shows the roots 102a of the salt-tolerant seedling 102 having grown downward through the sponge material 112 to reach and get soaked in the seawater W1 in the seawater portion 120.

Additionally, microbes 104 (salt-tolerating-imparting agents) are provided in both the fresh water medium portion 110 and the seawater portion 120. Specifically, in the fresh water medium portion 110, microbes 104 are provided in the fresh water W2 contained in the sponge material 112. In the seawater portion 120, the microbes 104 are provided as a result of direct feeding thereof into the seawater W1.

As the microbes 104, it is possible, for example, to use the microbes disclosed in *Journal of Plant Interactions*, Volume 9, Issue 1, 2014 or the like.

Next, the functions of the cultivation system for seeding and growing seedlings described above will be explained in detail with reference to the drawings.

As shown in FIG. 3A, in the present embodiment, a seed 102c of a salt-tolerant seedling 102 is sown in the fresh water W2 contained in the sponge material 112 in the fresh water medium portion 110. Specifically, the seed 102c may be simply placed on the upper surface of the sponge material 112 or may be positioned by being implanted within the surface layer portion of the sponge material 112. As a result, as shown in FIG. 3B, the seed 102c comes into contact with the fresh water W2 contained in the sponge material 112 and thereby sprouts and roots. Furthermore, microbes 104 are added to the sponge material 112 at an appropriate time. As a result, microbes 104 are allowed to adhere to the roots 102a extending inside the sponge 112, thereby enabling the sprout 102b and the roots 102a to grow.

Next, as shown in FIG. 3C, the roots 102a extending downward from the fresh water medium portion 110 pass through the clearance 103 to reach and get soaked in the seawater W1 in the seawater portion 120 in which the microbes 104 are provided beforehand, and the salt-tolerant seedling 102 is grown. Furthermore, in the present embodiment, the microbes 104 provided in the seawater W1 are allowed to adhere to the roots 102a, so that both the sprout 102b and the roots 102a are grown.

That is, in the present embodiment, the salt-tolerant seedling 102 can be induced to sprout and root with the seawater portion 120 and the fresh water medium portion 110 being isolated from each other by the clearance 103, and after sprouting and rooting, the salt-tolerant seedling 102 can grow with the emerged root 102a soaked in the seawater W1 in the seawater portion 120. The salinity in the seawater portion 120 may, for example, be set to be 1% or less, preferably less than 0.1%, and more preferably about 0% in the medium. Thus, it is possible to set conditions suitable for sprouting and rooting, thereby allowing sprouting and rooting to appropriately proceed.

Thus, the salt-tolerant seedling 102 can be grown using only fresh water W2, which is isolated from seawater W1, during the seeding stage before sprouting and rooting in which the deposition of salt has a detrimental influence, and can be grown using seawater W1 in the seawater portion 120 during a stage in which the salt promotes further growth of the roots that have already grown to some extent. For this reason, the productivity can be improved without causing the salt-tolerant seedlings 102 to wither.

Additionally, the present embodiment employs a simple structure wherein a clearance 103 is provided between the fresh water medium portion 110 and the seawater portion 120, thereby suppressing the cost of equipment.

Furthermore, since the support tube 111 provided in the fresh water medium portion 110 is detachably provided at a position above the seawater portion 120, the support tube 111 only needs to be appropriately replaced to enable the next seedlings to be cultivated, thereby allowing the productivity to be increased. In other words, if a support tube 111 is provided for each sponge material 112 as in the present embodiment, it is possible to replace the support tube 111 with respect to the seawater portion 120 in accordance with the state of growth of each salt-tolerant seedling 102.

Additionally, in the present embodiment, microbes 104 can be easily allowed to adhere to the salt-tolerant seedlings 102 by means of a simple structure wherein the microbes 104 are provided in the fresh water W2 contained in the fresh water medium 110 or in the seawater W1 in the seawater portion 120.

Additionally, the adhesion of the microbes 104 occurs during the growth of the salt-tolerant seedlings 102, so that the salt-tolerant seedlings 102 can be grown.

Furthermore, in the present embodiment, the fresh water medium portion 110 is isolated from the seawater W1 by means of the clearance 103, thereby making it possible to inhibit the diffusion and deposition of seawater in the fresh water medium portion 110 or in the seed 102c of the salt-tolerant seedling 102 before sprouting and rooting.

Additionally, by changing the size (height) of the clearance 103, the timing for allowing the roots 102a of the salt-tolerant seedling 102 to come into contact with the seawater W1 or the microbes 104 can be shifted, whereby the growth rate of the salt-tolerant seedling 102 can be adjusted.

Furthermore, in the present embodiment, the clearance 103 can be set to at least 1 mm, or to within a range of at least 10 cm and at most 30 cm, whereby the diffusion of salt water into the fresh water medium 110 or to the seed 102c can be more reliably suppressed.

As mentioned above, with the cultivation system for seeding and growing seedlings according to the present embodiment, it is possible to realize improved cultivation by using seawater W1, by means of a simple, low-cost structure.

Third Embodiment

Figure 4:
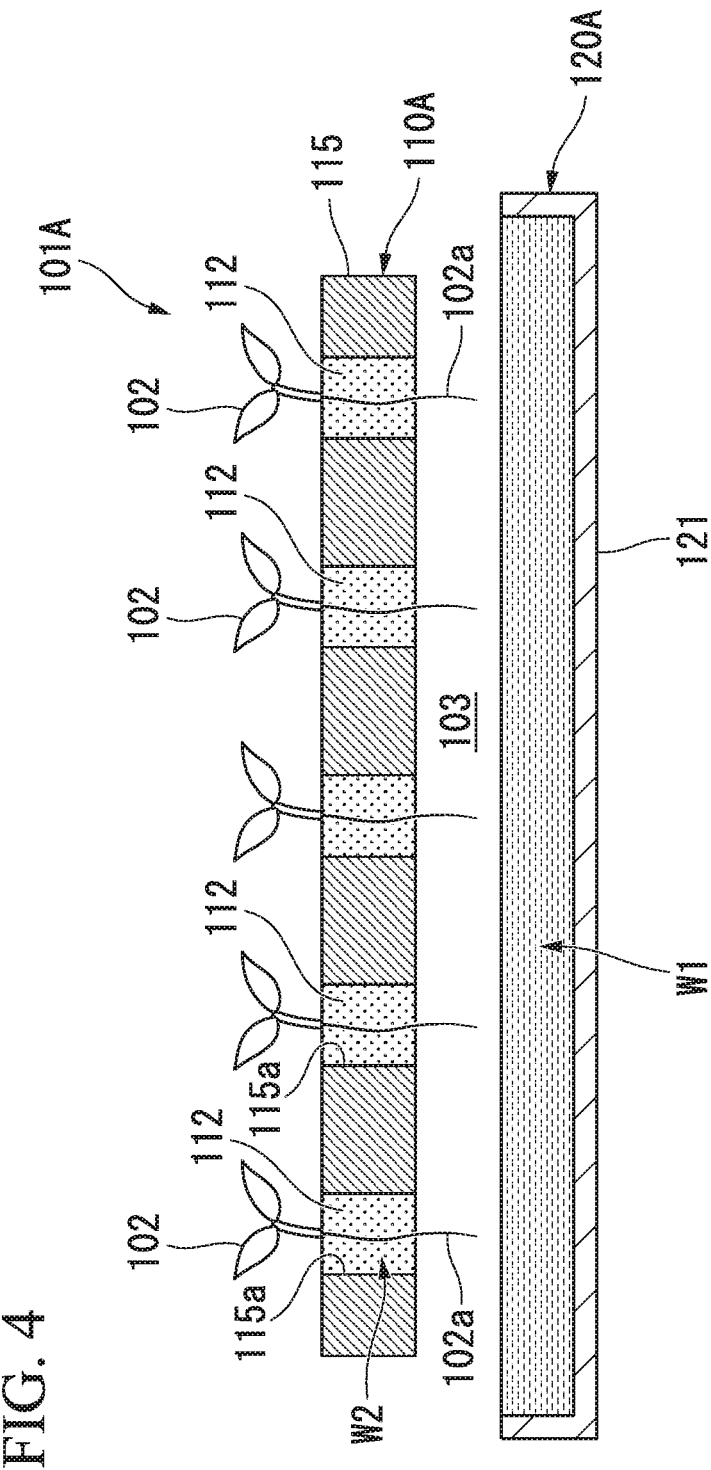
FIG. 4 is a side section view schematically showing a cultivation system for seeding and growing seedlings according to a third embodiment.

The cultivation system 101A according to the third embodiment shown in FIG. 4 is provided with a fresh water medium portion 110A having a holder 115 (support) in which multiple sponge materials 112 are disposed.

Figure 5:
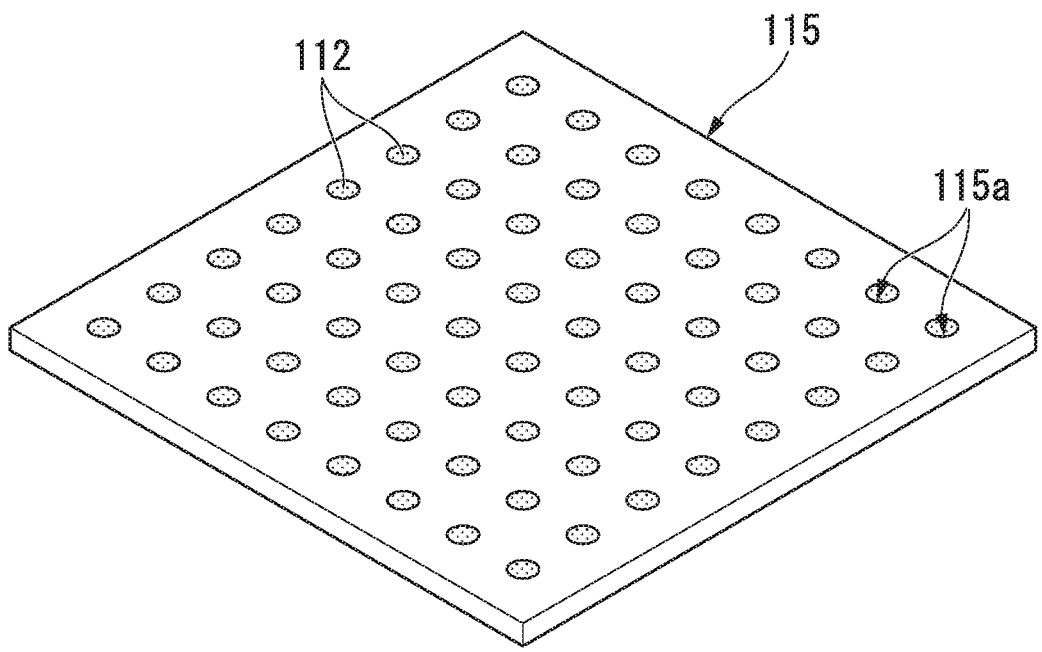
FIG. 5 is a perspective view of a holder in a fresh water medium portion in the cultivation system shown in FIG. 4.

As shown in FIG. 5, the holder 115 is formed of a plate-shaped member made of a lightweight material that floats on water such as, for example, styrofoam, plastic, wood or plasterboard, which has multiple through-holes 115a penetrating therethrough in the thickness direction, at predetermined intervals in the planar directions. The multiple sponge materials 112 are respectively fitted into the multiple through-holes 115a. The through-holes 115a are not limited to being arranged in matrix (i.e., rows and columns) at specific intervals as shown in FIG. 5, and can be appropriately arranged in accordance with the type of salt-tolerant seedling 102 to be cultivated or the like.

Figure 6A:
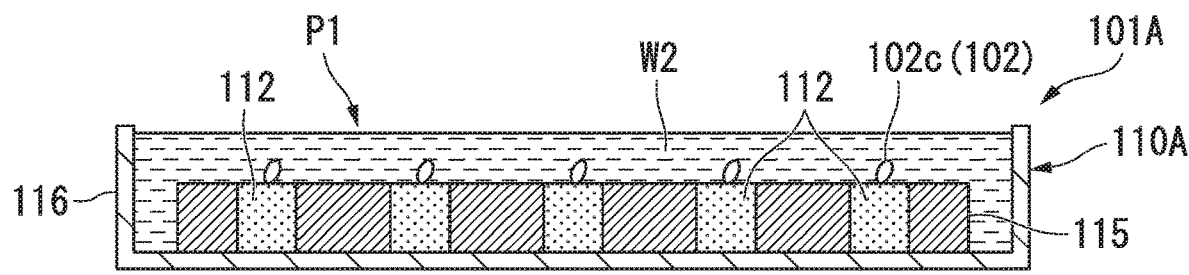
FIG. 6A is a diagram showing a cultivation step using the cultivation system shown in FIG. 4.

The fresh water medium portion 110A in the present embodiment is provided with a fresh water tub 116 storing fresh water W2 so as to allow immersion of the holder 115, as shown in FIG. 6A.

Figure 6B:
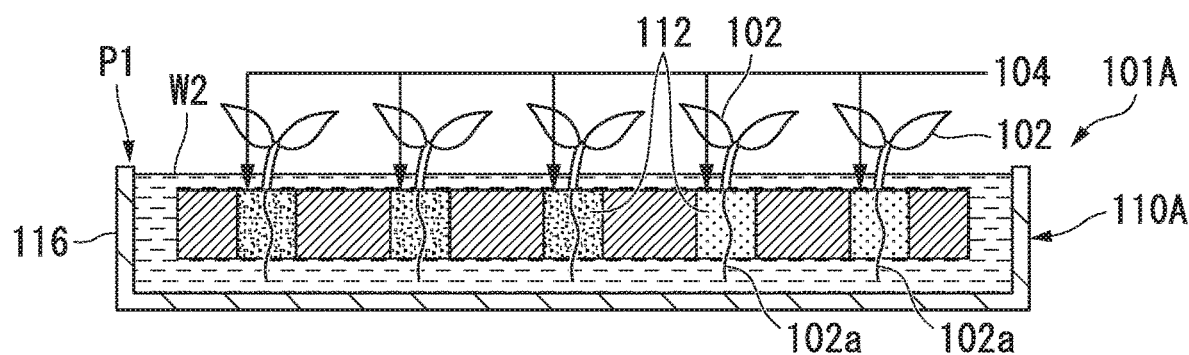
FIG. 6B is a diagram showing a cultivation step using the cultivation system shown in FIG. 4.
Figure 6C:
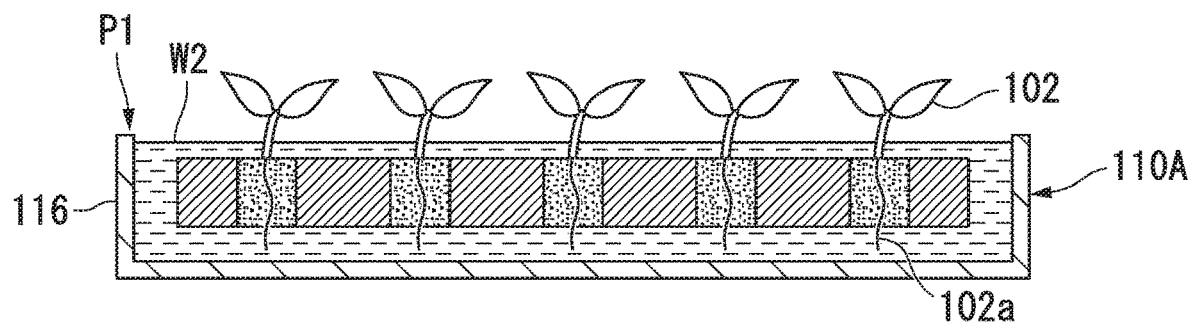
FIG. 6C is a diagram showing a cultivation step using the cultivation system shown in FIG. 4.
Figure 6D:
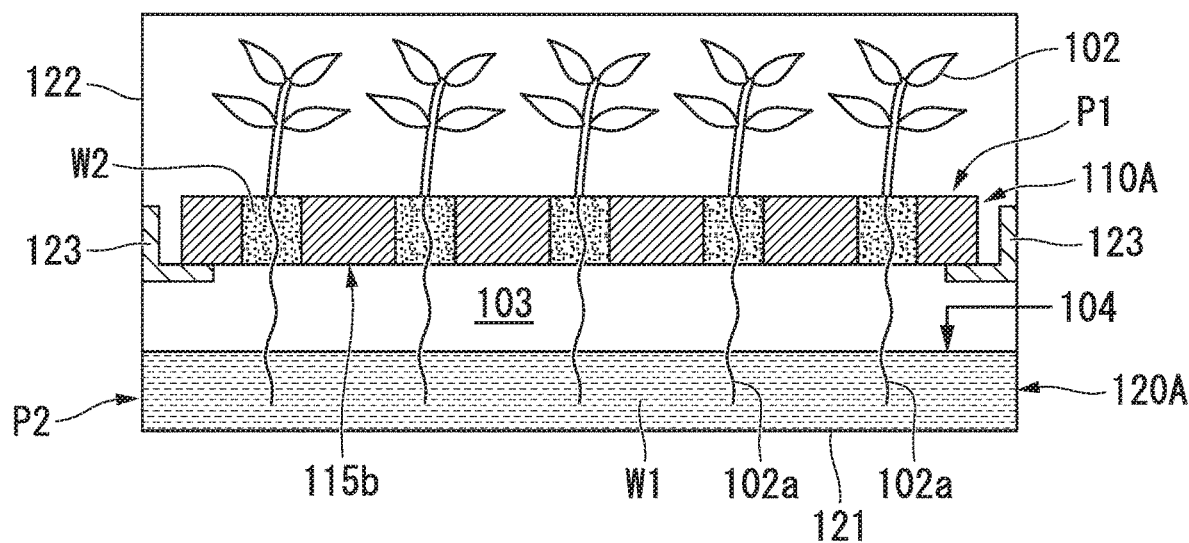
FIG. 6D is a diagram showing a cultivation step using the cultivation system shown in FIG. 4.

Additionally, as shown in FIG. 4, in the seawater portion 120A, a seawater tub 121 storing seawater W1 is provided separately from the above-mentioned fresh water tub 116. As shown in FIG. 6D, a frame 122 is installed on the seawater tub 121, and holding portions 123 that detachably hold the holder 115 are provided on this frame 122. The holding portions 123 are formed in an L-shape and are disposed around a part or all of the circumference of the seawater tub 121 along the circumferential direction thereof so as to support the holder 115 from below. The attachment positions of the holding portions 123 are set to be positions that are a predetermined distance above the surface of the seawater W1 in the seawater tub 121. In other words, the clearance 103 is provided and maintained between the seawater W1 and the lower surface 115b of the holder 115 held by the holding portions 123.

Next, the cultivation method using the cultivation system 101A according to the third embodiment will be explained with reference to FIG. 6A to 6D.

First, as shown in FIG. 6A, after seeds 102c of salt-tolerant seedlings 102 are sown in each of the multiple sponge materials 112 in the holder 115 in the fresh water medium area P1, the holder 115 is immersed in the fresh water W2 collected in the fresh water tub 116. Thereafter, as shown in FIGS. 6B and 6C, microbes 104 are added to the sponge material 112 at an appropriate time when the salt-tolerant seedlings 102 have sprouted and rooted. Subsequently, as shown in FIG. 6D, the holder 115 is detached from the fresh water tub 116 with the roots 102a of the salt-tolerant seedlings 102 reaching below the holder 115, and placed on the holding portions 123 in the seawater tub 121. As a result, the holder 115 is provided above the seawater W1 while leaving the clearance 103 therebetween.

Microbes 104 are added to the seawater W1 at an appropriate timing. This timing for adding the microbes 104 may be before or after the holder 115 is placed on the holding portions 123. As a result, the tips of the roots 102a of the salt-tolerant seedlings 102 that have grown to a predetermined length in the fresh water W2 are soaked in the seawater W1 in the seawater medium area P2.

Thus, in the third embodiment, the holder 115, which is held on the holding portions 123 in the seawater tub 121, is positioned above the seawater W1 with the clearance 103 therebetween, whereby seawater W1 can be prevented from adhering to the holder 115.

Furthermore, the fresh water tub 116 is provided at a position that is separate from the seawater tub 121, whereby the salt-tolerant seedlings 102 can be prevented from coming into contact with salt when sprouting and rooting in the fresh water W2 in the fresh water tub 116.

Additionally, when a holder 115 is provided for multiple sponge materials 112 (salt-tolerant seedlings 102) as in the present embodiment, it is possible to simultaneously replace multiple salt-tolerant seedlings 102 by replacing just one holder 115 in the seawater portion 120, thereby improving the efficiency of replacement operation.

Fourth Embodiment

Figure 7:
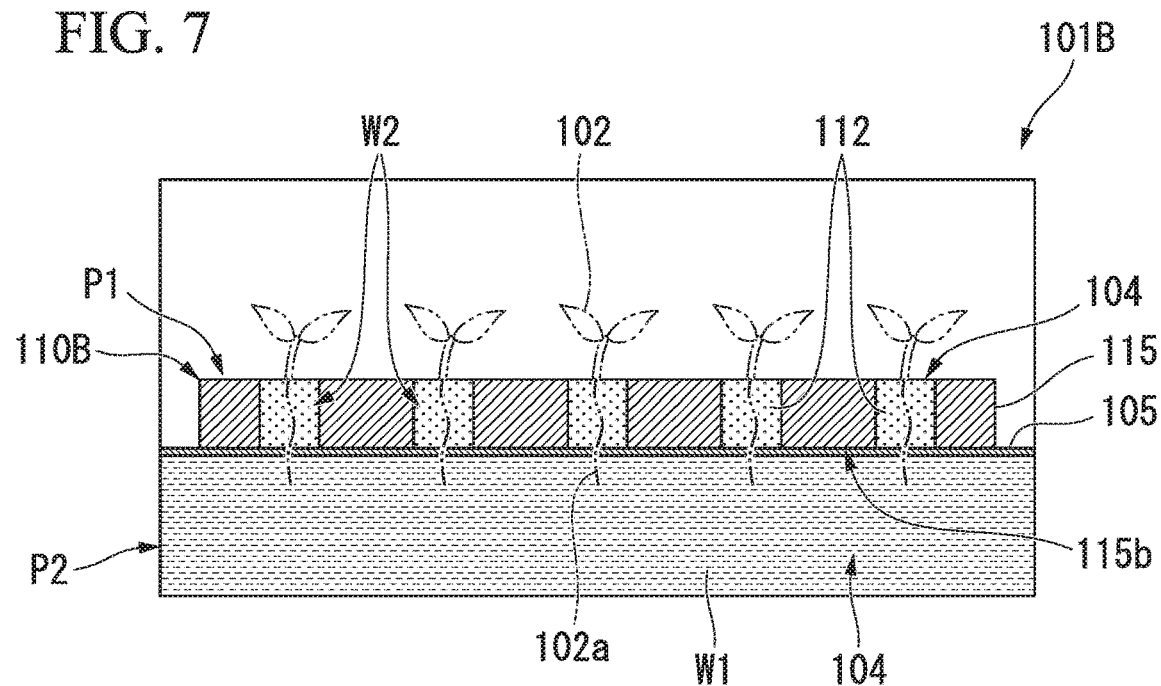
FIG. 7 is a side section view schematically showing a cultivation system for seeding and growing seedlings according to a fourth embodiment.

Next, the cultivation system 101B according to the fourth embodiment shown in FIG. 7 has a structure wherein a film-type semi-permeable membrane 105 (salt diffusion inhibition portion) is detachably disposed at an interface between the seawater W1 and a holder 115 as in the above-described third embodiment.

The semi-permeable membrane 105 is provided while covering the lower surface 115b of the holder 115. The semi-permeable membrane 105 is formed of a material which does not allow the salt in seawater W1 to pass therethrough to reach the holder 115 at a position thereof closer to the fresh water medium portion 110B.

In this instance, during the fresh water cultivation period until the salt-tolerant seedlings 102 sprout and root, the sprouting and seeding are induced by adding fresh water W2 to the sponge material 112 in the holder 115 in the fresh water cultivation area P1. For this purpose, the semi-permeable membrane 105 is provided between the fresh water medium portion 110B and the seawater portion 120B, i.e., at an interface between the holder 115 and the seawater W1, thereby isolating the two. Thus, it is possible to suppress the diffusion of seawater W1 resulting in adhesion of seawater W1 to the fresh water medium portion 1110B or to the seeds 102c of the salt-tolerant seedlings 102 before sprouting and rooting, and sprouting and rooting can be achieved without being affected by salt. Next, when the roots 102a in the holder 115 have grown large enough, for example, until the tips of the roots 102a reaches the semi-permeable membrane 105, the semi-permeable membrane 105 is removed from the position on the lower surface 115b of the holder 115. As a result, the holder 115 comes into contact with the seawater W1, so that the tip 102a is soaked in the seawater W1 in the seawater medium area P2.

Even in the case of the present fourth embodiment, the salt-tolerant seedlings 102 can be grown during the fresh water cultivation period and the seawater cultivation period by providing microbes 104 in the sponge material 112 and the seawater W1.

Additionally, by changing the material or the thickness of the semi-permeable membrane 105, the timing for contacting the roots 102a of the salt-tolerant seedlings 102 with the seawater W1 or the microbes 104 can be shifted, whereby the growth rate of the salt-tolerant seedlings 102 can be adjusted.

Fifth Embodiment

Figure 8A:
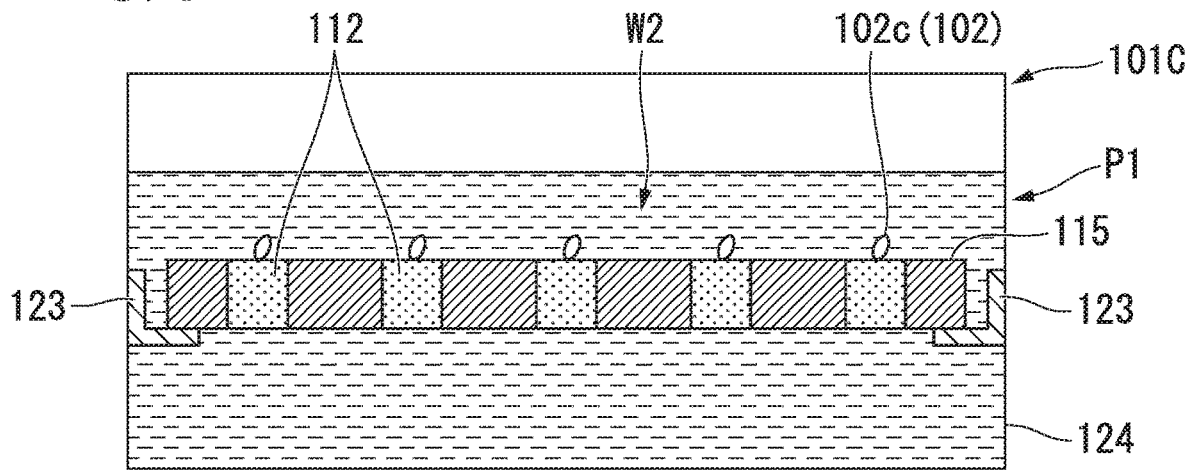
FIG. 8A is a diagram showing a cultivation step using a cultivation system for seeding and growing seedlings according to a fifth embodiment.
Figure 8B:
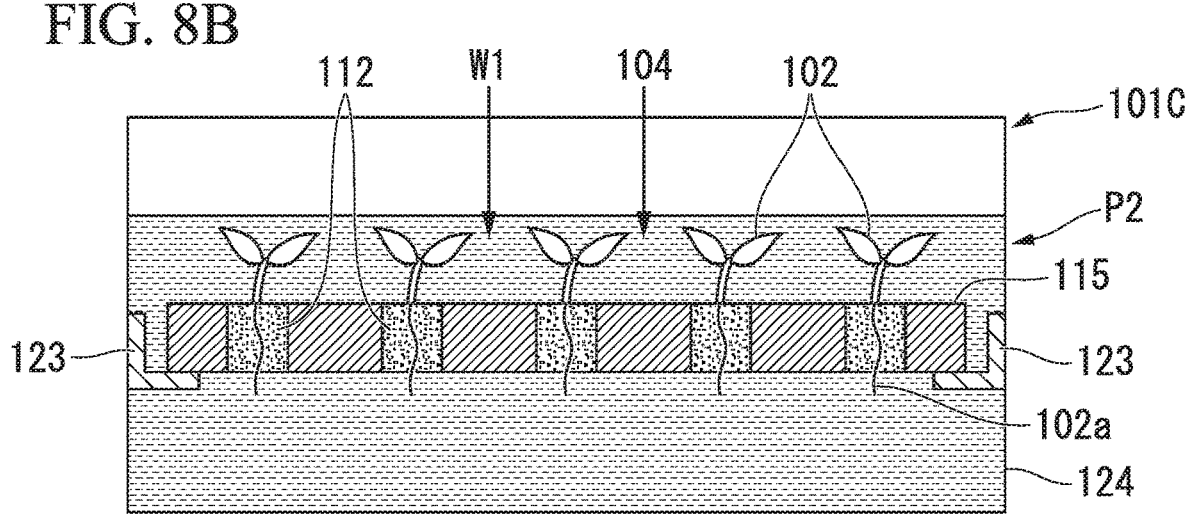
FIG. 8B is a diagram showing a cultivation step using a cultivation system for seeding and growing seedlings according to the fifth embodiment.
Figure 8C:
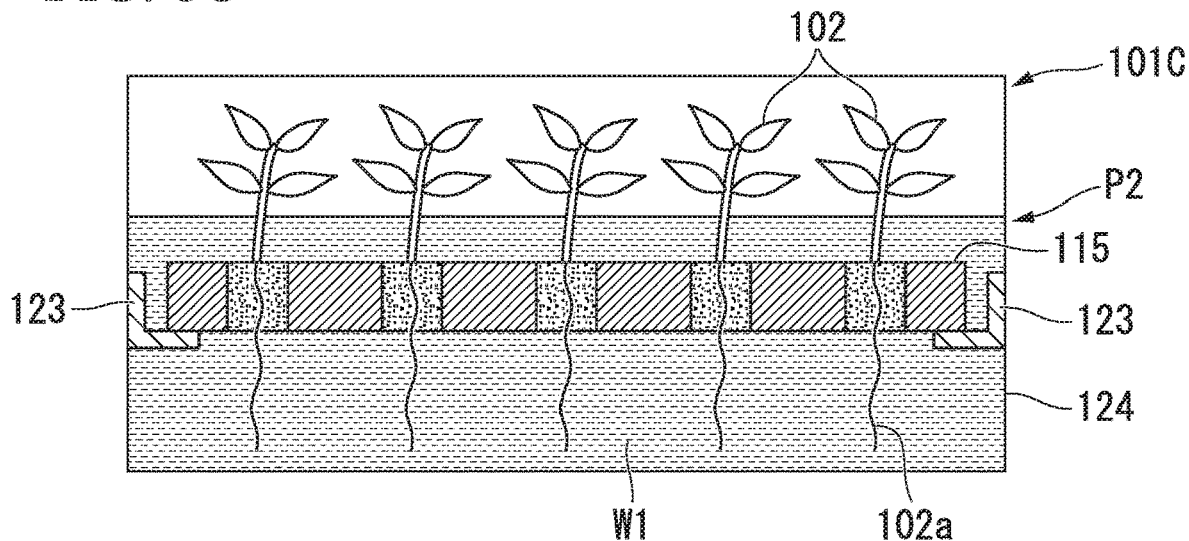
FIG. 8C is a diagram showing a cultivation step using a cultivation system for seeding and growing seedlings according to the fifth embodiment.

Next, the cultivation system 101C according to the fifth embodiment shown in FIG. 8A to 8C uses the holder 115 of the above-described third embodiment, but does not have a fresh water tub 116 as shown in FIG. 6A to 6C, and instead employs a fresh water/seawater tub 124. The fresh water/seawater tub 124 is provided with the holding portions 123 at roughly a middle portion in the vertical direction thereof, and fresh water W2 or seawater W1 is stored therein in an amount such that the holders 115 held on the holding portions 123 are immersed. In other words, the fresh water/seawater tub 124 is filled with fresh water W2 during the fresh water cultivation period and is filled with seawater W1 during the seawater cultivation period. The above-mentioned seawater W1 may be fresh water W2 to which seawater W1 has been added, and the above-mentioned fresh water W2 may be exchanged with seawater W1.

In the case of the fifth embodiment, first, as shown in FIG. 8A, the sponge materials 112 on the holder 115 are sown with seeds 102c of salt-tolerant seedlings 102 in the fresh water medium area P1, and this holder 115 is held on the holding portions 123 in the fresh water/seawater tub 124 filled with fresh water W2, so that the holder 115 is immersed in fresh water W2, and the salt-tolerant seedlings 102 are allowed to sprout and root. Subsequently, as shown in FIGS. 8B and 8C, seawater W1 is fed into the fresh water/seawater tub 124 and microbes 104 are added at a time when the roots 102a of the salt-tolerant seedlings 102 reach the bottom of the holder 115. The above-mentioned fresh water/seawater tub 124 is switched from a fresh water medium area P1 to a seawater medium area P2. The microbes 104 may be added to the fresh water W2 before or after the holder 115 is provided on the holding portions 123. As a result, the salt-tolerant seedlings 102 that have grown to a predetermined length in the fresh water W2 are soaked in the seawater W1.

In the fifth embodiment, the fresh water/seawater tub 124 is only filled with fresh water W2 during the fresh water cultivation period, whereby the holder 115 and the salt-tolerant seedlings 102 do not come into contact with salt and can be allowed to sprout and root without being affected by salt.

Sixth Embodiment

Figure 9A:
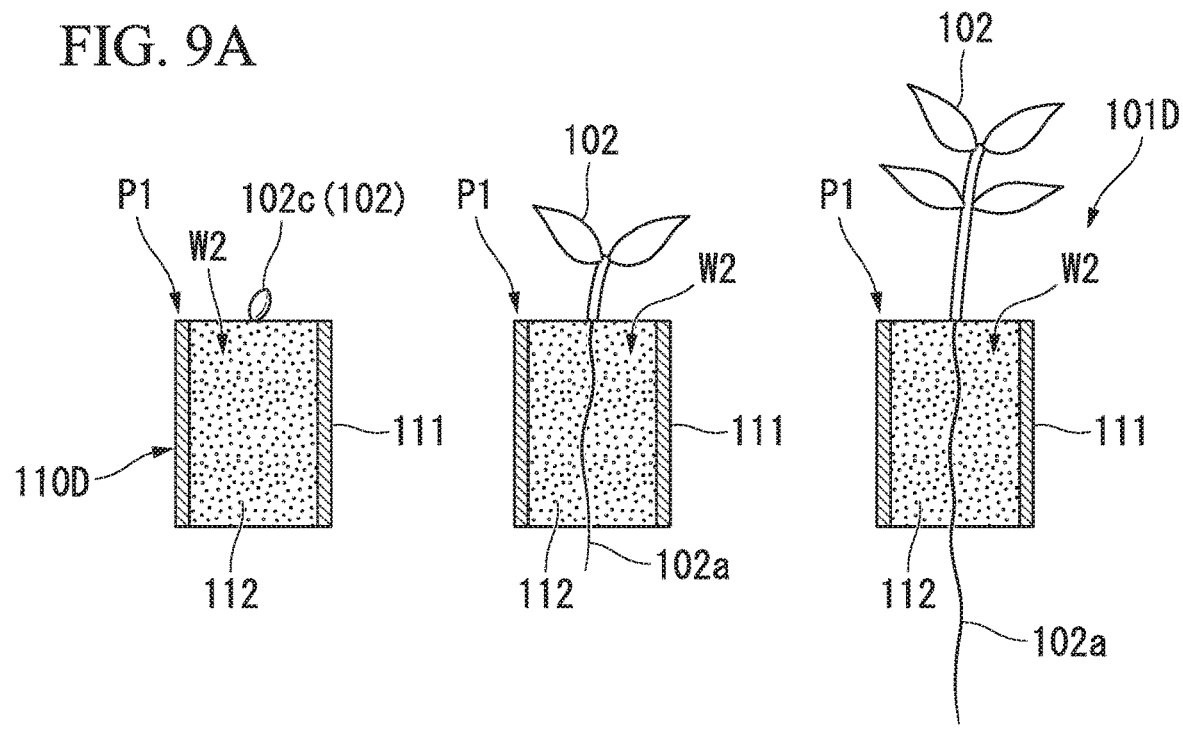
FIG. 9A is a side section view showing a cultivation system for seeding and growing seedlings according to a sixth embodiment, which is in a fresh water cultivation period.
Figure 9B:
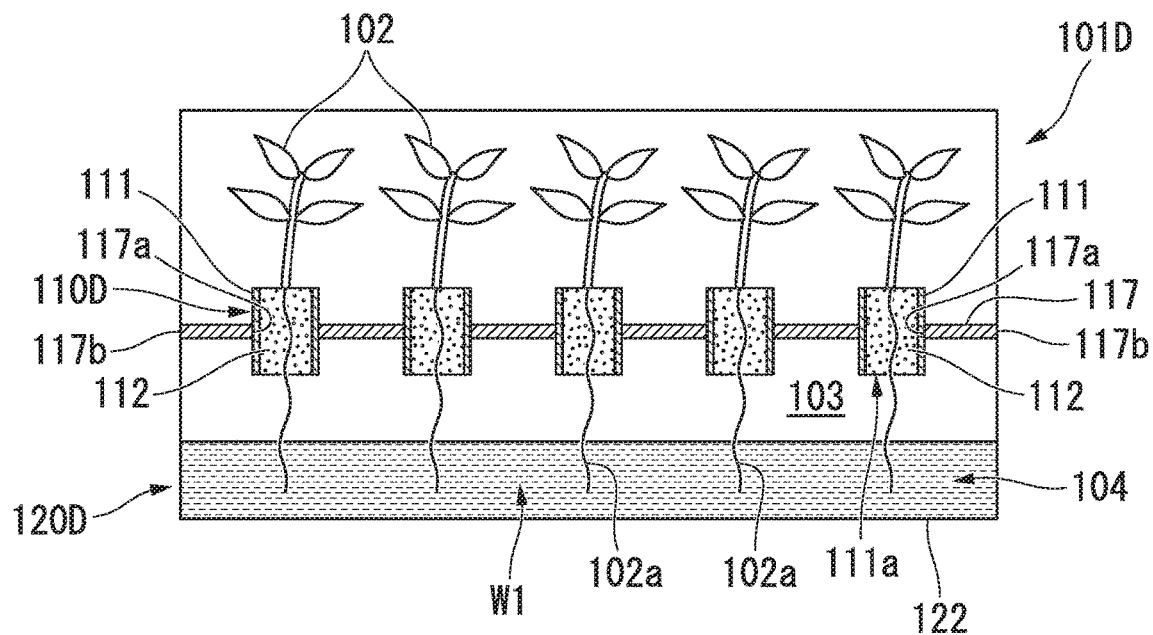
FIG. 9B is a side section view showing a cultivation system for seeding and growing seedlings according to the sixth embodiment, which is in a seawater cultivation period.

Next, in the cultivation system 101D according to the sixth embodiment shown in FIGS. 9A and 9B, a frame-shaped holder 117 (support) capable of holding multiple support tubes 111 (supports) as in the above-described second embodiment is provided inside the seawater tub 121. The support tubes 111 are fitted with sponge materials 112 on the insides thereof, as in the second embodiment.

The frame-shaped holder 117 is in the form of a plate, and the outer peripheral edges 117b thereof are affixed to or detachably attached to a frame 122 attached to the seawater tub 121. The frame-shaped holder 117 has multiple holding holes 117a into which the support tubes 111 are brought down and fitted, and which holds the support tubes 111 fitted therein. Furthermore, the attachment position of the frame-shaped holder 117 is set at a position such that the lower surfaces 111a of the support tubes 111 held on the frame-shaped holder 117 are a predetermined distance above the surface of the seawater W1 in the seawater tub 121. In other words, the clearance 103 is provided between the seawater W1 and the lower surfaces 111a of the support tubes 111, so that the support tubes 111 held by the frame-shaped holder 117 form fresh water medium portions 110D.

In the sixth embodiment, as shown in FIG. 9A, fresh water W2 is provided in the sponge material 112 in the support tubes 111 in the fresh water medium area P1 during the fresh water cultivation period, so as to induce sprouting and rooting. Thereafter, as shown in FIG. 9B, the support tubes 111 are fitted into the holding holes 117a in the frame-shaped holder 117 at a time when the emerged roots 102a having grown downward through the sponge material 112 start to further grow downward below the sponge material 112. As a result, the tips of the roots 102a of the salt-tolerant seedlings 102 that have grown to a predetermined length in the fresh water W2 are soaked in the seawater W1 in the seawater portion 120D.

By providing microbes 104 in the seawater W1 beforehand, microbes 104 are allowed to adhere to the roots 102a soaked in the seawater W1.

In this instance, during the fresh water cultivation period, only the supporting tubes 111 can be cultivated in an environment, in the fresh water medium area P1, that is not affected by salt, and furthermore, the support tubes 111 can be detached from the frame-shaped holder 117, whereby each support tube 111 can be replaced in accordance with the growth of the salt-tolerant seedling 102 therein.

While embodiments of the hydroponic system using seawater and the cultivation system for seeding and growing seedlings according to the present invention have been explained above, the present invention is not limited to the above-described embodiments, and may be appropriately modified within a range not departing from the spirit thereof.

For example, the numbers and positions of the devices are not limited to those indicated in the present first embodiment, and the volumes of the water tub 30, the seawater supply tank 22, the fresh water supply tank 23, the wastewater tank 42 and the like may be appropriately set without being limited to those in the above-described embodiments.

Additionally, features such as the shape, size and material of the semi-solid medium 31 for holding the salt-tolerant plants P are not limited to those in the present first embodiment, and may be appropriately modified in accordance with the types, amounts and the like of the salt-tolerant plants P.

Additionally, while microbes are used in the present embodiments, there is no limitation to the use of microbes, and for example, hormonal agents may also be used. As such hormonal agents, pyrroloquinoline quinone (e.g., Japanese Patent No. 5013326), plant hormones such as strigolactone (*Proceedings of the National Academy of Science of USA*, 111, 851-856, 2014), or the like may be used.

Furthermore, the area in which the microbes and the fertilizer are fed need not be limited to a position on the water feeding pipe 25 of the water feeding system 20 as in the present first embodiment, and the structure may, for example, be one in which they are fed in the water tub 30.

Additionally, in the present first embodiment, a water level detector 71, a fertilizer detector 72, a microbe detector 73 and a salinity detector 74 are used as the water tub monitoring portion 70, but there is no need for such a limitation, and it is possible to detect and monitor other properties of the seawater W1.

Additionally, the salt-tolerance-imparting agent need not be provided to grow the salt-tolerant seedlings 102 during both the fresh water cultivation period and the seawater cultivation period, and may be provided only during one of the periods.

In the present embodiments, a sponge material 112 is used as the semi-solid medium, which, however, is only a non-limiting example. Basically, the semi-solid medium may be any material as long as to the material, holding the fresh water W2 in the support (support tube 111, holder 115), enables the seeds 102c of the salt-tolerant seedlings 102 to grow, while supporting the salt-tolerant seedlings 102. For example, a gel-type substance or a reverse-osmosis membrane may be employed instead of the sponge material 112.

Additionally, in the present embodiments, one salt-tolerant seedling 102 is provided and grown in one area of sponge material 112, which, however, is only a non-limiting example, and it is possible to provide multiple salt-tolerant seedlings 102 in each area of the sponge material 112.

Furthermore, in the present embodiments, a bottom plate having holes opened therein may be provided in the through-holes 115a of the holder 115 or the support tubes 111. In other words, by providing a bottom plate having holes with a smaller diameter than the inner diameters of the through-holes 115a in the holder 115 or the support tubes 111, it is possible to prevent the sponge material 112 fitted into the through-holes 115a from falling out of the support tubes 111 or the holder 115.

Figure 10:
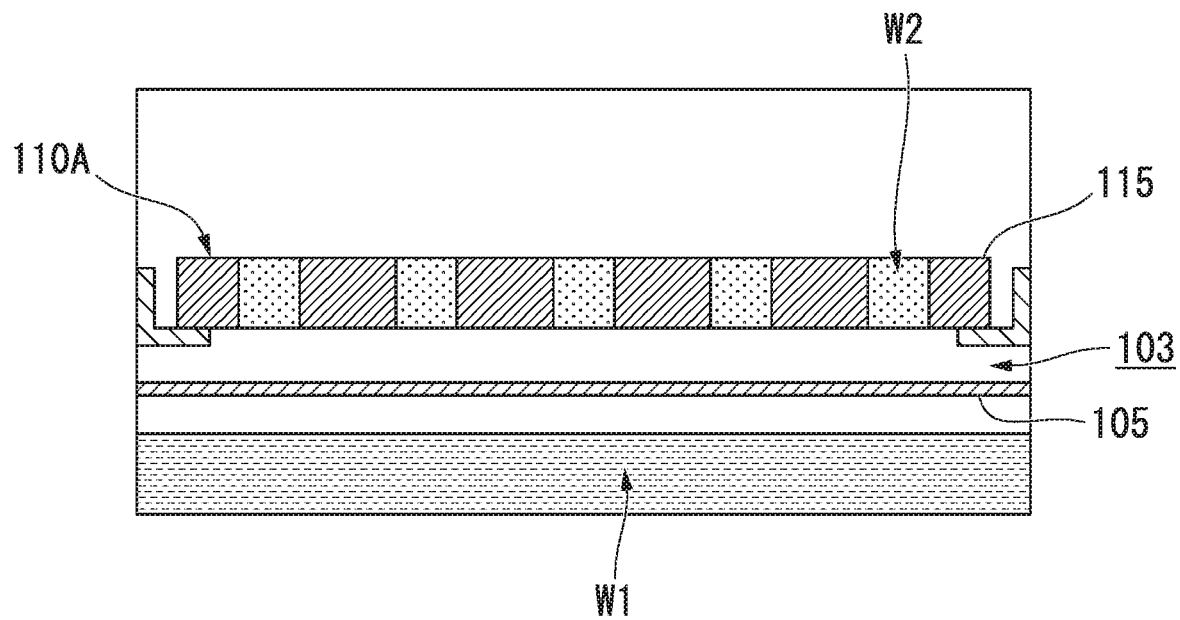
FIG. 10 is a side section view showing a cultivation system for seeding and growing seedlings according to another embodiment.

Additionally, it is possible to provide a semi-permeable membrane 105, as shown in FIG. 7, in the clearance 103 between the seawater W1 and the holder 115, as shown in FIG. 4, in the above-described third embodiment, as in the cultivation system 101E shown in FIG. 10. In this case, it is possible to more reliably keep the salt in the seawater W1 from diffusing into the fresh water medium portion 110A.

Figure 11:
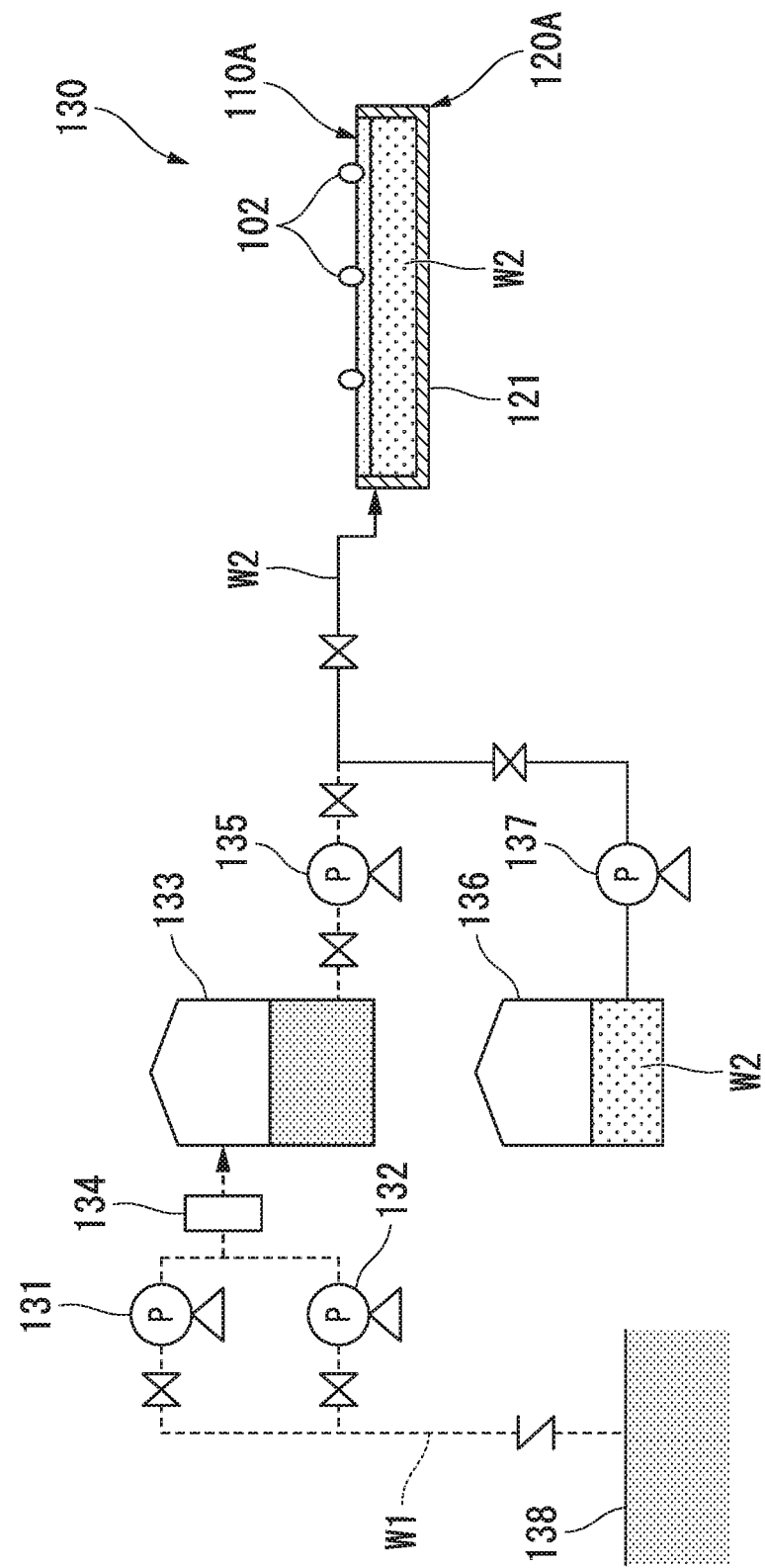
FIG. 11 is a schematic diagram showing a cultivation system for seeding and growing seedlings according to another embodiment.
Figure 12:
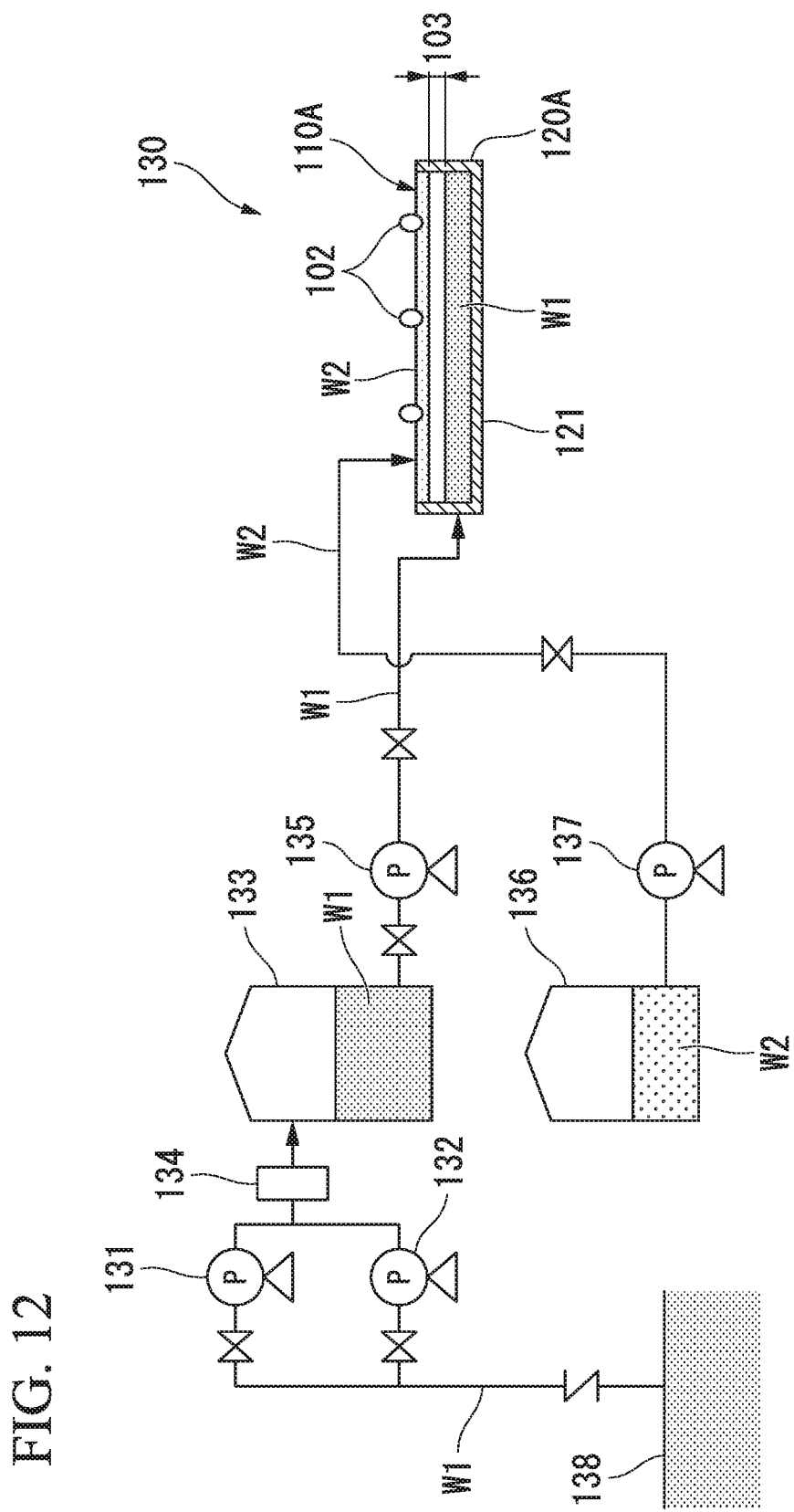
FIG. 12 is a schematic diagram showing a cultivation system for seeding and growing seedlings according to another embodiment.

Additionally, the cultivation systems according to the above-described embodiments may be configured in the manner shown in FIG. 11 and FIG. 12. The cultivation systems 130 shown in FIG. 11 and FIG. 12 include: a pair of water supply pumps 131, 132 that pump up seawater W1 from the sea 138; a seawater tub 121 that stores the seawater W1 pumped up by the water supply pumps 131, 132 and that has a fresh water medium portion 110A and a seawater portion 120A in which salt-tolerant seedlings 102 to be cultivated are disposed; a seawater tank 133 that temporarily collects the seawater W1 pumped up from the sea 138 by the water supply pumps 131, 132; a fresh water tank 136 in which fresh water W2 is collected; a seawater feeding pump 135 provided on a water feeding pipe connecting the seawater tank 133 with the seawater tub 121; and a fresh water feeding pump 137 provided on a water feeding pipe connecting the fresh water tank 136 with the seawater tub 121. The seawater W1 supplied by the pair of water supply pumps 131, 132 is passed through the filter 134 and fed to the seawater tank 133. These cultivation systems 130 show overall schemes for instances in which the fresh water W2 in the seawater tub 121 is exchanged with seawater W1 or seawater W1 is mixed into the fresh water W2.

FIG. 11 shows a system in which water is fed to the seawater tub 121 by switching between seawater W1 from the seawater tank 133 and fresh water W2 from the fresh water tank 136. In this instance, FIG. 11 shows the seawater tub 121 being filled with fresh water W2 from the fresh water tank 136.

FIG. 12 shows a system in which water is fed to the seawater tub 121 using separate systems for the seawater W1 from the seawater tank 133 and the fresh water W2 from the fresh water tank 136. FIG. 12 shows a clearance 103 being provided between the seawater W1 in the seawater portion 120A and the fresh water medium portion 110A, with the seawater tub 121 filled with seawater W1 from the seawater tank 133.

Furthermore, in the present embodiment, seawater is used as the salt water in the seawater medium area P2, but the salt water is not necessarily limited to seawater, and may be salt water obtained by adding sodium chloride to water.

Furthermore, regarding features such as the shape, size and number of supports (support tubes 111, holder 115 and frame-shaped holder 117) in the fresh water medium area P1 and the positions and shapes of the semi-solid media (sponge material 112 etc.), there is no limitation in the above-described embodiments, and for example, these features may be appropriately set in accordance with conditions such as, for example, the type and number of the salt-tolerant seedlings 102 to be cultivated, and available installation space.

Additionally, the features of the seawater medium area P2 (salt water medium area) may also be appropriately set, for example, in accordance with the features of the fresh water medium area P1.

Aside therefrom, it is possible to replace the components in the above-described embodiments with conventionally known components within a range not departing from the spirit of the present invention.

REFERENCE SIGNS LIST

1 Hydroponic system
3, 3A, 3B, 3C Cultivation system
20 Water feeding system
21, 21A, 21B Water supply pump
22 Water supply tank
23 Fresh water supply tank
24 Water feeding pump
25 Water feeding pipe
27 Filter (removal unit)
30 Water tub
31 Semi-solid medium
40 Drainage system
41 Circulation pump
42 Wastewater tank
43 Wastewater treatment unit
50 Growth promoter supply system
51 Microbe feeder
52 Fertilizer feeder
60 Circulation system
61 Micronanobubble generator (dissolved oxygen supply unit)
62 Cooling apparatus (seawater temperature adjustment unit)
70 Water tub monitoring unit (monitoring unit)
71 Water level detector
72 Fertilizer detector
73 Microbe detector
74 Salinity detector
101, 101A to 101E Cultivation system
102 Salt-tolerant seedling
102a Root
103 Clearance (salt diffusion inhibition portion)
104 Microbe (salt-tolerance-imparting agent)
105 Semi-permeable membrane (salt diffusion inhibition portion)
110, 110A, 110B, 110D Fresh water medium portion
111 Support tube (support)
112 Sponge material (semi-solid medium)
115 Holder (support)
115a Through-hole
116 Fresh water tub
117 Frame-shaped holder (support)
120, 120A, 120B, 120D Seawater portion (salt water portion)
121 Seawater tub
123 Holding portion
P Salt-tolerant plant
S Sea
W1 Seawater (salt water)
W2 Fresh water

The invention claimed is:

1. A hydroponic system using seawater for hydroponic cultivation of salt-tolerant plants, which comprises: a microbe feeder that introduces microbes that attach to roots of plants to make the plants salt-tolerant plants; a micro-nanobubble generator that supplies dissolved oxygen to the seawater;
a water supply pump that pumps up, from the sea, seawater having a salinity, a bacteria content and an unwanted matter content that are less than or equal to predetermined threshold values;
a water tub that stores seawater pumped up by the water supply pump and accommodates salt-tolerant plants to be cultivated, the water tub containing a semi-solid medium in which seeds or rooted seedlings of the salt-tolerant plants are placed and which is detachably disposed on an upper edge portion of the water tub; and
a removal unit that removes bacteria and unwanted matter from the seawater obtained from the sea,
wherein the seawater from which the bacteria and the unwanted matter have been removed by the removal unit is fed to the water tub.

2. The hydroponic system as according to in claim 1, wherein the removal unit has a function of removing substances that inhibit growth of the salt-tolerant plants due to heavy metals, and substances that are harmful to humans.

3. The hydroponic system according to claim 1, which further comprises a monitoring unit that detects the properties of the seawater before being supplied to the water tub and the seawater after being supplied to the water tub.

4. The hydroponic system according to claim 1, which is configured to replace some or all of the seawater in the water tub with new one.

5. The hydroponic system according to claim 1, which further comprises a seawater temperature adjustment unit that adjusts the temperature of the seawater supplied to the water tub.

6. The hydroponic system according to claim 1, which further comprises a dissolved oxygen supply unit that supplies dissolved oxygen to the seawater supplied to the water tub.

* * * * *